US007773129B2

(12) United States Patent  (10) Patent No.: US 7,773,129 B2
Ueda et al.  (45) Date of Patent: Aug. 10, 2010

(54) IMAGE PICKUP DEVICE, IMAGING APPARATUS CONTAINING THE SAME, AND CONTROL METHOD THEREOF

(75) Inventors: Osamu Ueda, Kanagawa (JP); Hisataka Hirose, Kanagawa (JP); Toshiki Ishida, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1138 days.

(21) Appl. No.: 10/633,166

(22) Filed: Aug. 1, 2003

(65) Prior Publication Data

US 2004/0095485 A1   May 20, 2004

(30) Foreign Application Priority Data

Aug. 2, 2002 (JP) ............................. 2002-226666
Nov. 19, 2002 (JP) ............................. 2002-335096

(51) Int. Cl.
*H04N 5/262* (2006.01)
*H04N 5/235* (2006.01)

(52) U.S. Cl. .................................... 348/240.3; 348/362

(58) Field of Classification Search ... 348/240.1–240.3, 348/320, 322, 333.11, 362

See application file for complete search history.

(56) References Cited

U.S. PATENT DOCUMENTS

| 5,043,817 | A | * | 8/1991 | Kinugasa et al. | ......... | 348/240.2 |
| 5,196,939 | A | * | 3/1993 | Elabd et al. | ................. | 348/314 |
| 5,831,676 | A | * | 11/1998 | Takahashi et al. | ........... | 348/362 |
| 6,496,224 | B2 | * | 12/2002 | Ueno | ......................... | 348/322 |
| 6,765,616 | B1 | | 7/2004 | Nakano et al. | | |
| 6,947,074 | B2 | | 9/2005 | Koseki et al. | | |
| 6,982,755 | B1 | * | 1/2006 | Kikuzawa | ................... | 348/241 |
| 7,046,290 | B2 | * | 5/2006 | Nozaki | ...................... | 348/350 |

(Continued)

FOREIGN PATENT DOCUMENTS

JP    A 03-117985    5/1991

(Continued)

OTHER PUBLICATIONS

An Office Action from the Japanese Patent Office dated Jul. 25, 2006 for JPA 2002-335096.

(Continued)

*Primary Examiner*—Timothy J Henn
(74) *Attorney, Agent, or Firm*—Cowan, Liebowitz & Latman, P.C.

(57)  ABSTRACT

An object of the present invention is to provide an imaging apparatus capable of obtaining a sufficient resolution in a picture signal for zooming in on an output signal of an image pickup device by means of an electronic zoom process and a control method thereof. To attain this object, a timing generator generates a timing signal for controlling timing for reading charges to an image pickup device and the timing for mixing or transferring the charges. A zoom control portion determines a scaling factor for, by signal processing, expanding or reducing picture data generated based on the output signal of the image pickup device. The zoom control portion also determines the number of mixed pixels and a cutout range of the charges in the image pickup device. A vertical scaling factor control portion controls the timing generator so that mixture of the charges and charge transfer will be compliant with the number of mixed pixels and the cutout range respectively as determined by the zoom control portion.

2 Claims, 22 Drawing Sheets

U.S. PATENT DOCUMENTS

| | | |
|---|---|---|
| 7,154,542 B1 | 12/2006 | Yuki et al. |
| 7,265,783 B2 * | 9/2007 | Fukuda .................... 348/240.2 |
| 2001/0043275 A1 * | 11/2001 | Hirota et al. ................ 348/312 |
| 2004/0046884 A1 * | 3/2004 | Nakano et al. ......... 348/333.01 |
| 2004/0165080 A1 * | 8/2004 | Burks et al. .............. 348/222.1 |

FOREIGN PATENT DOCUMENTS

| | | |
|---|---|---|
| JP | A 10-322601 | 12/1998 |
| JP | 2000188716 A * | 7/2000 |
| JP | A 2000-299810 | 10/2000 |
| JP | A 2001-078081 | 3/2001 |
| JP | A 2001-086394 | 3/2001 |
| JP | A 2001-197371 | 7/2001 |
| JP | A 2002-057931 | 2/2002 |
| JP | A 2002-112096 | 4/2002 |
| JP | 2002199266 A * | 7/2002 |
| JP | A 2002-199266 | 7/2002 |
| JP | A 2002-314868 | 10/2002 |
| JP | A 2003-264844 | 9/2003 |

OTHER PUBLICATIONS

An Office Action from the Japanese Patent Office dated Aug. 1, 2006 for JPA 2002-226666.

English translation of the Japanese Office Action dated Jul. 25, 2006 for JPA 2002-335096.

English translation of the Japanese Office Action dated Aug. 1, 2006 for JPA 2002-226666.

* cited by examiner

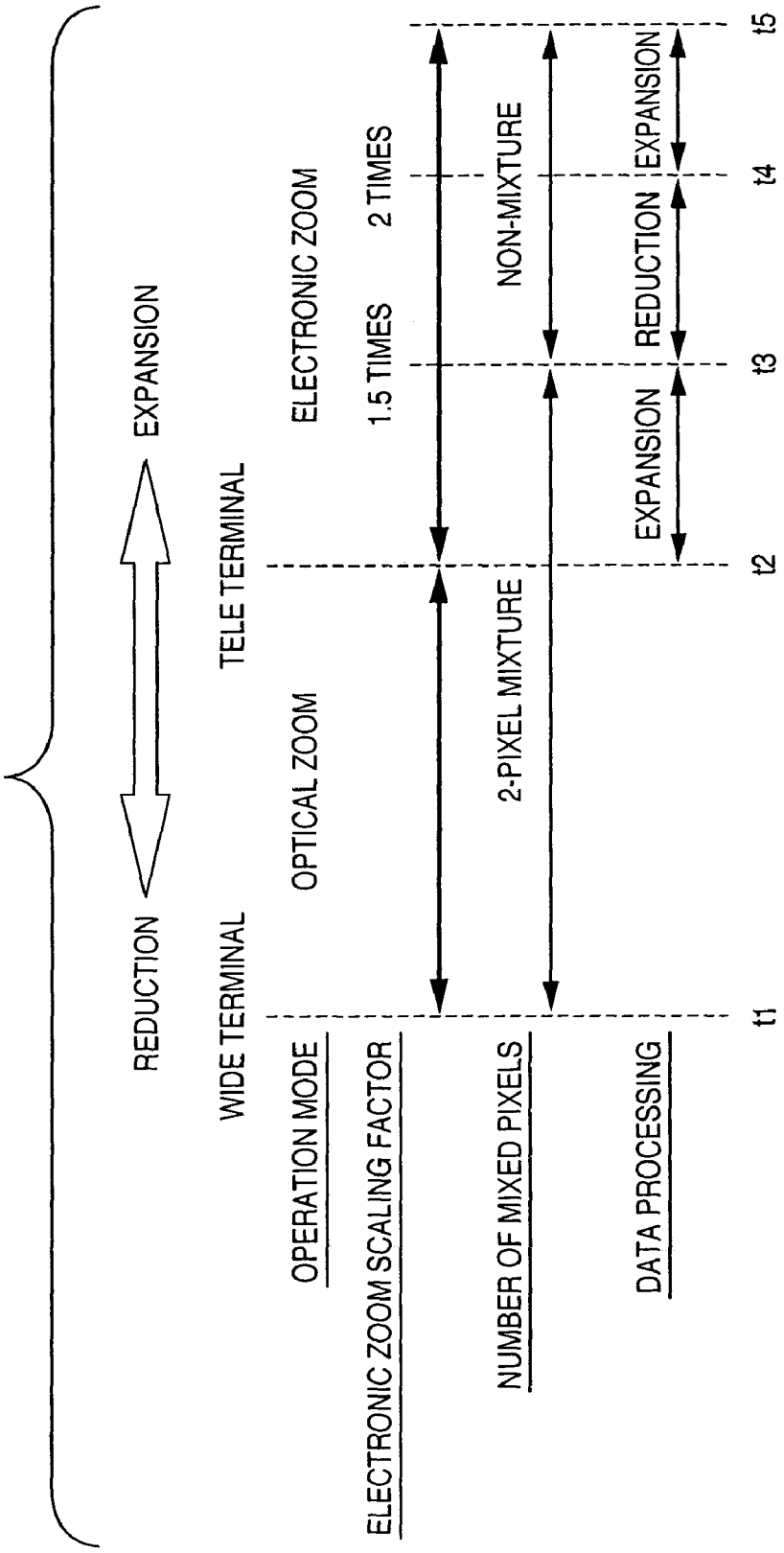

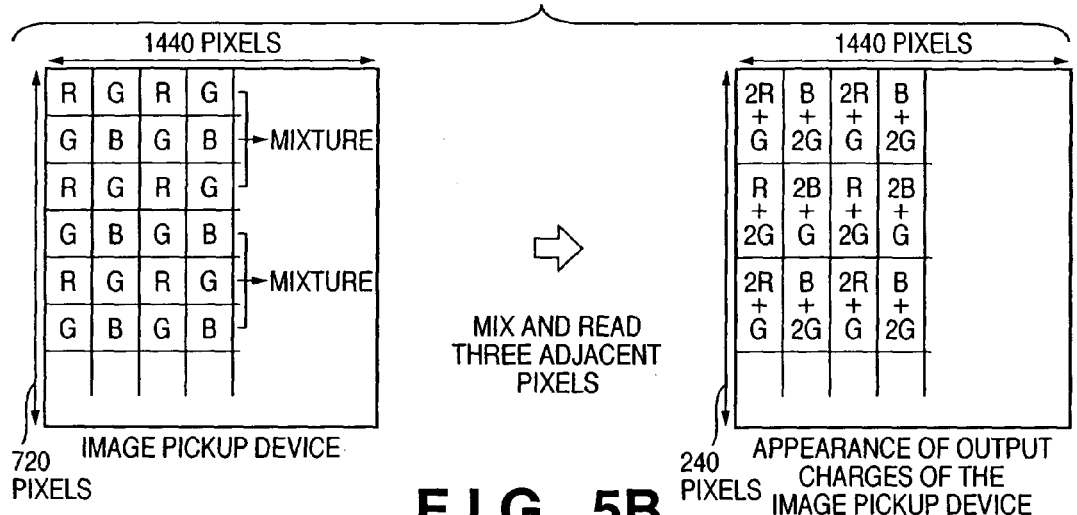
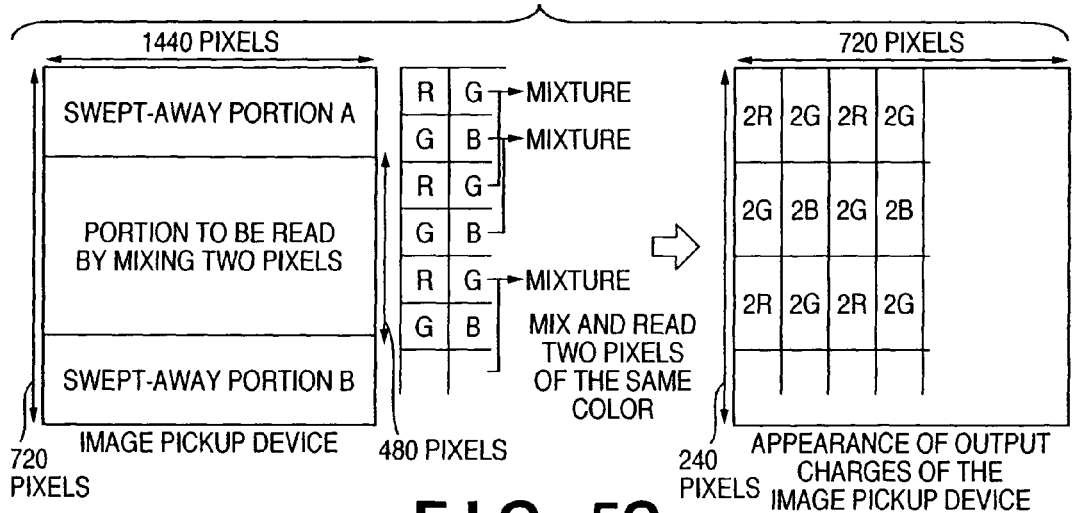
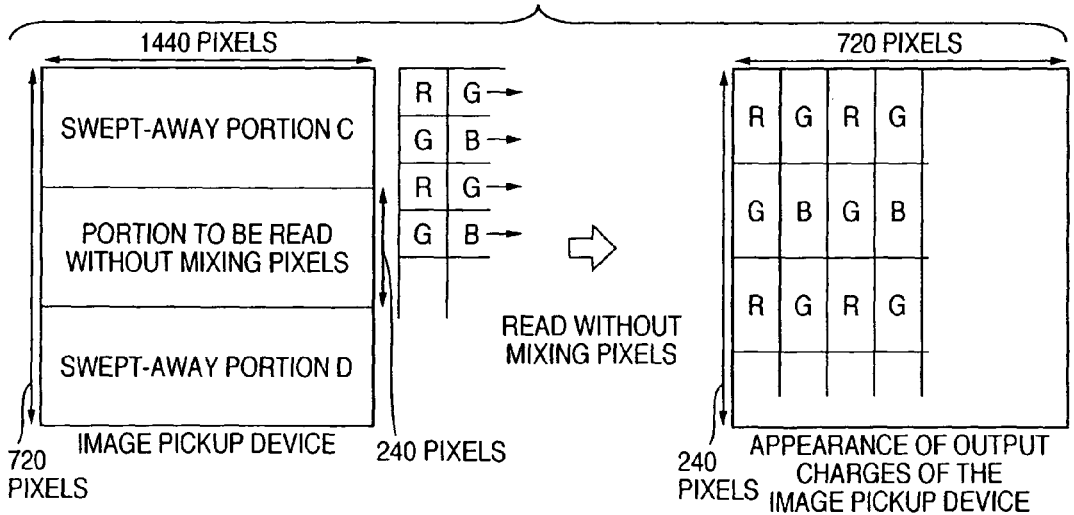

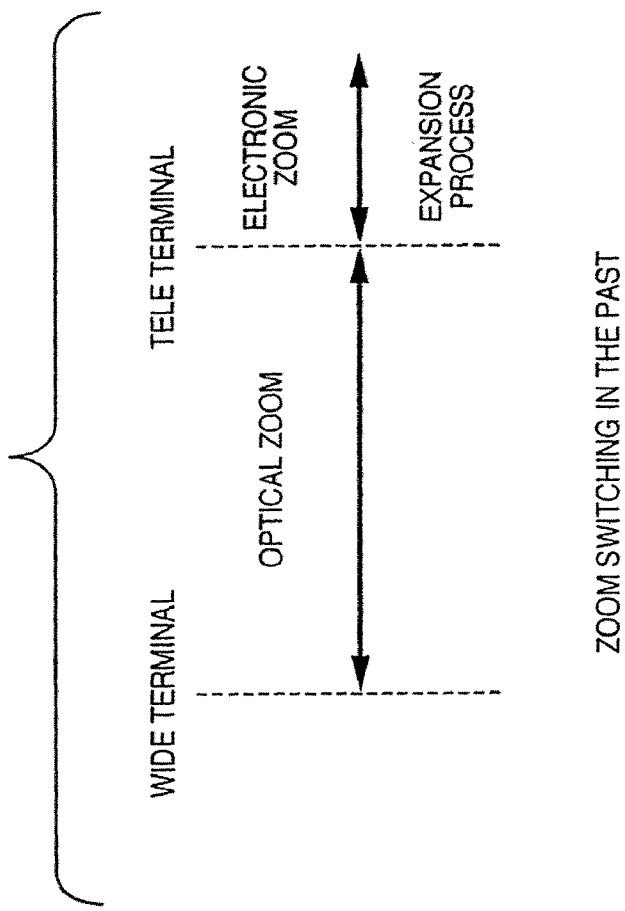

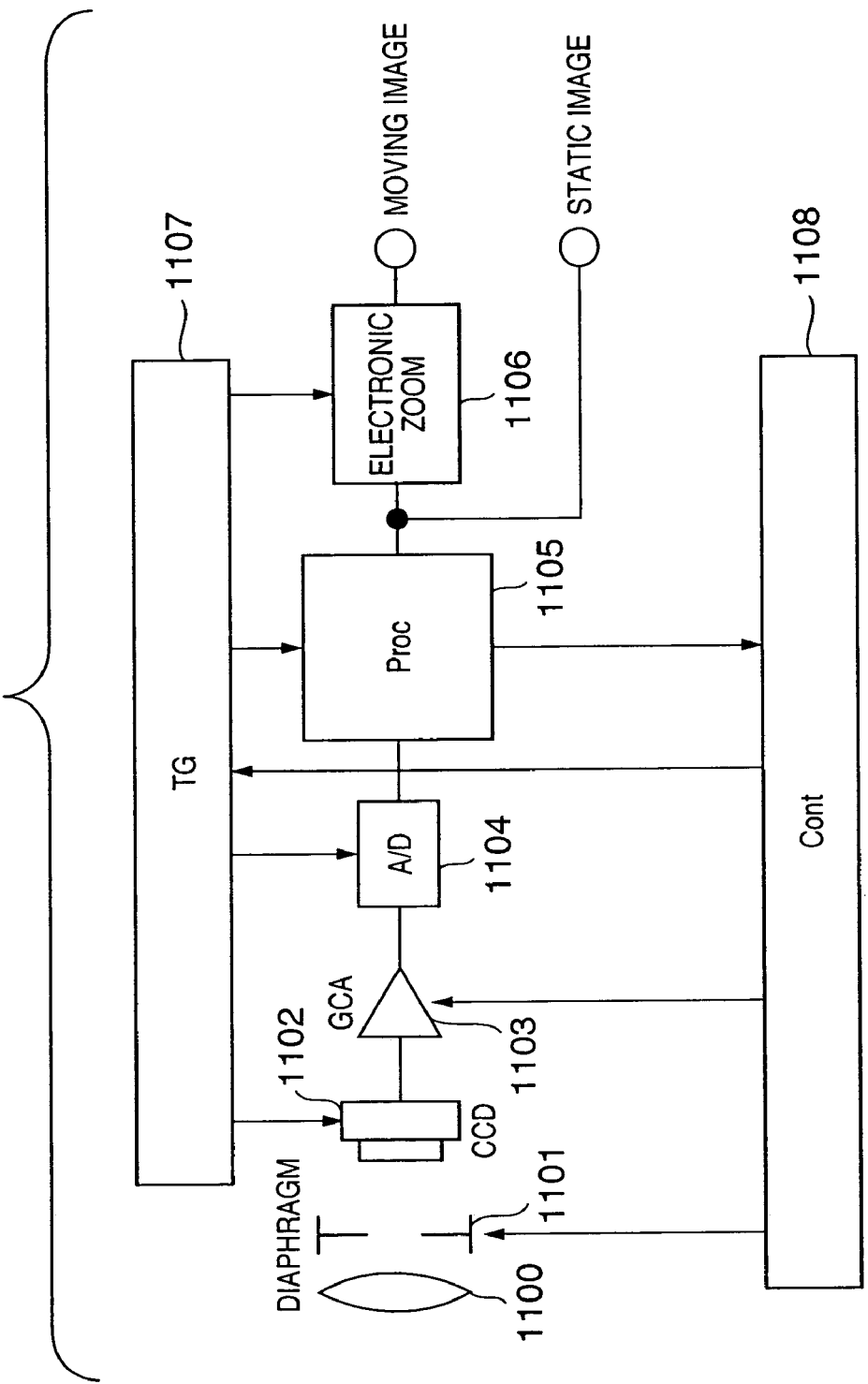

Prior Art

Prior Art

Prior Art

IMAGE PICKUP DEVICE, IMAGING APPARATUS CONTAINING THE SAME, AND CONTROL METHOD THEREOF

FIELD OF THE INVENTION

The present invention relates to operation of an imaging apparatus having a zoom function and the imaging apparatus using a multi-pixel image pickup device applicable to shooting of both a static image and a moving image.

BACKGROUND OF THE INVENTION

The imaging apparatus in the past converts into a digital signal an electrical signal photoelectrically converted and outputted by an image pickup device such as a CCD (Charge Coupled Device) and performs digital signal processing so as to obtain a predetermined picture signal. Furthermore, the imaging apparatus having a zoom function can generally shoot by arbitrarily determining an angle of view from a wide-angle side to a telescopic side by using an optical zoom lens before the image pickup device. And it can further obtain the picture signal on the telescopic side by an electronic zoom process for electrically expanding an object image formed in a central portion of the image pickup device by the digital signal processing.

FIG. 9 is a block diagram showing an overview configuration of the imaging apparatus having the zoom function in the past.

In FIG. 9, an imaging apparatus 30 is the imaging apparatus which has the zoom function by means of an optical zoom and an electronic zoom and generates a television signal and so on from an output signal of the image pickup device so as to output it. A lens 40 forms the object image on an image pickup device 42. A motor 41 is the motor for driving the lens 40. The image pickup device 42 is the image pickup device for photoelectrically converting the CCD and so on. A TG (Timing Generator) 43 is a timing generator for driving the image pickup device 42. An AD converter 44 is an AD (Analog to Digital) conversion circuit for converting the output signal of the image pickup device 42 into the digital signal. A signal processing portion 45 is a signal processing circuit for performing a color separation process, a gamma process and so on based on the output signal of the AD converter 44 and generating a luminance signal and a color-difference signal.

Zoom operation buttons 46 are buttons for a user to perform a zoom operation. In general, the zoom operation buttons 46 are comprised of an expansion button (or a TELE button) for expanding an image and a reduction button (or a WIDE button) for returning an expanded image to its original state. A zoom switching portion 47 is a circuit for determining whether an expansion/reduction process according to the operation of the zoom operation buttons 46 should be performed by the optical zoom or electronic zoom and switching between them. An optical zoom control portion 48 is the circuit for outputting a control signal for controlling the motor 41 to perform the expansion and reduction process by adjusting the angle of view of the object formed for the image pickup device 42 by the lens 40 based on the determination of the zoom switching portion 47.

In the case where the lens 40 is on the most telescopic side (TELE terminal), the optical zoom control portion 48 outputs a notice signal for notifying it to the zoom switching portion 47. The zoom switching portion 47 switches between the optical zoom and electronic zoom based on the notice signal and the operation of the zoom operation buttons 46.

Here, a switching process of the zoom switching portion 47 will be further described.

FIG. 10 is a diagram showing the switching process between the optical zoom and electronic zoom by the zoom switching portion 47 of the imaging apparatus 30 in the past. As shown in FIG. 10, the zoom switching portion 47 switches to the electronic zoom after the lens 40 to be moved by the optical zoom reaches the TELE terminal. To be more precise, an optical zoom control portion 48 detects the TELE terminal of the optical zoom from a position of the motor 41, and outputs the notice signal to the zoom switching portion 47.

Next, the operation of the above-mentioned image pickup device in the past shown in FIG. 9 will be described by taking as an example the image pickup device comprised of 480 pixels by 720 pixels shown in FIG. 11A.

FIG. 11A is a diagram showing an example of pixel mixture of the image pickup device in the past.

Usually, the image pickup device 42 performs interlace reading when shooting a moving image. To be more specific, charges of two vertically adjacent pixels are mixed and transferred to the image pickup device 42 by a drive from the TG 43. As shown in FIG. 11A, the image pickup device 42 forming a color filter of a complementary color for each pixel outputs a signal having mixed the charges of two pixels of cyan (Cy) and magenta (Mg) and a signal having mixed the charges of two pixels of yellow (Ye) and green (Gr).

As above, the image pickup device 42 mixes two pixels in a vertical direction, and outputs the signal by vertical 240 pixels and horizontal 720 pixels as an equivalent of one field. Next, this signal is converted into the digital signal by the AD converter 44. Next, the color separation process, gamma process, and luminance signal and color-difference signal generation are performed by the signal processing portion 45. It is also possible to generate and output an NTSC television signal based on the luminance signal and color-difference signal.

Next, the process of the electronic zoom of the imaging apparatus in the past will be described.

FIG. 11B is a diagram showing a method of reading the charges from the image pickup device in the case of performing the electronic zoom process. As shown in FIG. 11B, in the electronic zoom process in which an output is produced by electrically expanding a part of a screen, an expanding process is performed by using the signal in the central portion of the image pickup device 42. FIG. 11B is the case of performing the electronic zoom of 2× scaling factor (processing scaling factor), where the 240 pixels in the central portion, of the vertical 480 pixels, are read by taking one field period. To be more specific, the signal in the central portion of the image pickup device 42 is intermittently read by one horizontal line so that the signal is extended to one field period (one image scanning period) and outputted.

On intermittent reading, during the period in which the signal is not read from the image pickup device 42, the signal processing portion 45 performs an interpolation process by using a memory and so on for interpolating by utilizing the signal already read. Therefore, the signal to be read by the electronic zoom process in the case of the electronic zoom of 2 times shown in FIG. 11B is the signal of 120 pixels in the vertical direction as to the image pickup device 42. The signal processing portion 45 generates the signal of 240 pixels in the vertical direction, by means of the interpolation process by using the memory, from the intermittently read signal of 120 pixels in the vertical direction.

However, the above-mentioned imaging apparatus uses the image pickup device for reading data of the same number of pixels as a resolution of a display device such as a TV monitor, and so, in the case of the electronic zoom process of which scaling factor is 2 times for instance, a ¼ portion of an imaging surface of the image pickup device is displayed on the entire surface of the display device. Thus, there is a problem that the resolution of the image displayed on the display device becomes ½ horizontally and vertically.

To be more specific, in the case where the image pickup device comprised of 480 pixels by 720 pixels is utilized to expand it by the electronic zoom process to 2 times in the horizontal and vertical directions respectively, the vertical 480 pixels and horizontal 720 pixels are generated by interpolating based on the signal of vertical 240 pixels and horizontal 360 pixels (¼ of the number of all the pixels) in the central portion of the image pickup device so that the resolution is significantly reduced.

In recent years, the image pickup devices as well as the pixels are miniaturized due to miniaturization of semiconductors. For that reason, there are increasing numbers of the imaging apparatuses for shooting the moving images using the image pickup device having the number of pixels equal to or more than the number of moving image recording pixels, which can also be used for shooting the static images, in addition to shooting the moving images, by utilizing multiple pixels thereof.

As will be explained by referring to FIG. 15, the embodiments including this embodiment and the following embodiments will be described on the assumption that the image pickup device of a line of horizontal 2160 pixels and vertical 1440 pixels is used as shown in FIG. 16.

In FIG. 15, reference numeral 1400 denotes a lens for shooting, 1401 denotes a diaphragm apparatus for controlling an amount of light passing through the lens 1400, 1402 denotes a CCD image pickup device for converting a formed optical image into the electrical signal, 1403 denotes a gain control amplifier capable of changing an amplification factor at appropriate times, 1404 denotes an A/D converter for converting an analog signal into the digital signal, 1405 denotes a signal processing circuit for converting an imaging signal into the data for recording, 1407 denotes a timing generator for supplying an operation timing signal to each portion, 1408 denotes a controller for controlling each of the above described, and 1409 denotes a reduction processing circuit for converting an image size of an inputted image signal.

The optical image having passed through the lens 1400 and diaphragm 1401 is converted into the electrical signal by the CCD image pickup device 1402. The imaging signal obtained from the CCD image pickup device 1402 is preprocessed in an analog fashion by the gain control amplifier 1403, sampled by the A/D converter 1404, processed into a record image signal by the signal processing circuit 1405, recorded on a record medium through the reduction processing circuit 1409 to have the number of pixels in compliance with a record format on shooting the moving image thereafter, and sent to the record medium with the as-is number of pixels on recording the static image. Each portion is controlled by the control signal from the controller 1408, and the timing generator 1407 supplies an appropriate timing signal to each portion based on it.

At this time, the signal from a necessary pixel must be read at a frame rate (approximately ⅟60 second in the case of NTSC) in order to record the moving image. In that case, if driven to read the signal from the entire multi-pixel image pickup device, it becomes a very high-speed reading clock so as to cause a problem such as reduction in transfer efficiency of the charges of the image pickup device.

In the case of reading the image pickup device of a line of horizontal 2160 pixels and vertical 1440 pixels at 60 frames, reading speed is 2160×1440×60=187 MHz so that the transfer efficiency of the charges of the image pickup device is conspicuously reduced. It is possible, on shooting the static image, to sufficiently reduce the reading speed since it is not restrained by the frame rate.

However, the number of pixels to be recorded is originally smaller than all the pixels of the multi-pixel device, and so it is often rendered possible, in the case of an ordinary imaging apparatus utilizing the multi-pixel device, to drive it to cut out and selectively read only pixel signals necessary for the moving image from the multi-pixel image pickup device so as to operate and read at the same speed as driving the image pickup device of the ordinary number of pixels.

As in FIGS. 17A and 17B, on shooting the static image, the image pickup device is driven to read all the pixels as in FIG. 17A. At this time, it is driven at the speed sufficiently capable of reading since it is not restrained by the frame rate. On shooting the moving image, it becomes sufficiently feasible to read it to the extent not to reduce the transfer efficiency by reading only the lines necessary for the record format from the central portion of the image pickup device as in FIG. 17B.

By this method, however, the angle of view of the image shot through the lens of the same focal length is significantly different between the static image and moving image as understandable from FIGS. 17A and 17B.

In this connection, there is a known method of solving the above described problem by vertically adding and reading a plurality of pixels on shooting the moving image.

As will be explained by referring to FIG. 18, in the case of the image pickup device of vertical 1440 lines, an equivalent of three lines of vertical transfer CCD is added on the vertical transfer CCD and is vertically read as an addition signal of the three lines. The number of vertical read lines thereby relatively becomes 480 lines and a ⅓ vertical transfer rate becomes sufficient, and so the transfer efficiency is not reduced even if full-frame reading is performed so as to allow the transfer of the charges.

A circuit configuration in this case is in FIG. 19. Function of the reference numerals are the same as those in FIG. 15.

Furthermore, there is a devised system wherein, by utilizing this method and adding an electronic zoom circuit 1906 for expanding and reducing the signal obtained from a signal processing circuit 1905 as the circuit in FIG. 20, the method of adding three lines and reading from the entire screen, method of adding two lines and further cutting out and reading from the lines doubling the number of record lines (480× 2=960 lines), and method of cutting out and reading only the number of record lines (480 lines) without adding the lines as in FIG. 21 are switched and the above described electronic zoom circuit 1906 is combined therewith so as to allow the electronic zoom of high scaling factor with little degradation of the image.

The operation of the controller for setting the electronic zoom circuit at this time is as in FIG. 22. The electronic zoom scaling factor is set at 1 time on ordinary shooting, where three vertical lines are added and the scaling factor of the electronic zoom circuit 1906 is 1 time. And in the case of operating the electronic zoom, the signal for adding three lines is used while the electronic zoom scaling factor is set between 1 and 1.5 times, and an electronic zoom scaling factor setting is sequentially assigned to the scaling factor of the electronic zoom circuit 1906 in a following stage to expand it.

Expansion is further continued, and when the electronic zoom scaling factor setting reaches 1.5 times, two vertical lines are added and the electronic zoom scaling factor setting divided by 1.5 is assigned to the scaling factor setting of the electronic zoom circuit 1906.

The expansion is further continued, and when the electronic zoom scaling factor setting reaches 3 times, vertical line addition is stopped and one line is read, and the electronic zoom scaling factor setting divided by 3 is assigned to the scaling factor setting of the electronic zoom circuit 1906.

However, as for the above described electronic zoom operation in the cases of adding three lines, adding two lines and only the equivalent of one line without performing addition, there will be significant differences, as a matter of course, in an signal charge amount per pixel out of the image pickup device, such as the "equivalent of the charges of three pixels," "equivalent of the charges of two pixels" and "equivalent of the charge of one pixel" respectively.

For that reason, while performing the electronic zoom, brightness of the screen changes on switching the number of added lines so that it becomes an unnatural screen. Even if a diaphragm 1900 for exposure control is changed in order to prevent this, the speed of the diaphragm to follow cannot be so high, and so the brightness of the screen inevitably becomes discontinuous for a certain period of time.

SUMMARY OF THE INVENTION

The present invention was implemented in consideration of the above-mentioned circumstances, and an object thereof is to provide an imaging apparatus capable of obtaining a sufficient resolution in a picture signal adapted to zoom in an output signal of an image pickup device by the electronic zoom process and a control method thereof.

Another object of the present invention is to keep a charge amount per read pixel constant by controlling an electronic shutter according to timing adapted to switch the number of added lines.

To solve the above-mentioned problem and attain the objects, according to a first aspect of the present invention, the imaging apparatus is comprising the image pickup device having an imaging area in which a plurality of light receiving elements are two-dimensionally placed, an optical zoom device adapted to expand or reduce an image formed on a light receiving surface of the image pickup device, a controller having a first control mode adapted to output picture data by using a signal from a first area in the above described imaging area, a second control mode adapted to output the picture data by using the signal from a second area smaller than the above described first area, and exerting control so that, in the case of the above described first control mode, the above described picture data is outputted by the signal having mixed the signals of the plurality of light receiving elements, and in the case of the above described second control mode, the above described picture data is outputted by an unmixed signal of each of the plurality of light receiving elements or the signal having mixed the signals of the plurality of light receiving elements less than the number thereof mixed in the case of the above described first control mode, and when zooming with the above described optical zoom device, the above described controller controls it to operate in the above described first control mode.

According to a second aspect of the present invention, the control method of the imaging apparatus is characterized by being the one of the imaging apparatus including the image pickup device having the imaging area in which the plurality of light receiving elements are two-dimensionally placed and the optical zoom device adapted to expand or reduce the image formed on the light receiving surface of the image pickup device, the control method having the first control mode adapted to output the picture data by using the signal from the first area in the above described imaging area, the second control mode adapted to output the picture data by using the signal from the second area smaller than the above described first area, and exerts control so that, in the case of the above described first control mode, the above described picture data is outputted by the signal having mixed the signals of the plurality of light receiving elements, and in the case of the above described second control mode, the above described picture data is outputted by an unmixed signal of each of the plurality of light receiving elements or the signal having mixed the signals of the plurality of light receiving elements less than the number thereof mixed in the case of the above described first control mode, and when zooming with the above described optical zoom device, it is controlled to operate in the above described first control mode.

According to a third aspect of the present invention, the imaging apparatus is comprising the image pickup device having the imaging area in which the plurality of light receiving elements are two-dimensionally placed, a controller having the first control mode adapted to output the picture data by using the signal from the first area in the above described imaging area, the second control mode adapted to output the picture data by using the signal from the second area smaller than the above described first area, and exerting control so that, in the case of the above described first control mode, the above described picture data is outputted by the signal having mixed the signals of the plurality of light receiving elements, and in the case of the above described second control mode, the above described picture data is outputted by an unmixed signal of each of the plurality of light receiving elements or the signal having mixed the signals of the plurality of light receiving elements less than the number thereof mixed in the case of the above described first control mode, and a drive circuit adapted to change storage time of optical charges in the above described image pickup device according to the number of the above described mixed signals.

According to a fourth aspect of the present invention, the imaging apparatus is comprising the image pickup device having the imaging area in which the plurality of light receiving elements are two-dimensionally placed, and a controller having the first control mode adapted to output the picture data by using the signal from the first area in the above described imaging area, and the second control mode adapted to output the picture data by using the signal from the second area smaller than the above described first area, and exerting control so that, in the case of the above described first control mode, the above described picture data is outputted by the signal having mixed the signals of the plurality of light receiving elements, and in the case of the above described second control mode, the above described picture data is outputted by an unmixed signal of each of the plurality of light receiving elements or the signal having mixed the signals of the plurality of light receiving elements less than the number thereof mixed in the case of the above described first control mode, and changing an amplification factor adapted to amplify the signal from the above described imaging area according to the number of the above described mixed signals.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and

BRIEF DESCRIPTION OF THE DRAWINGS

FIG. 2 is a diagram showing a switching process between an optical zoom and an electronic zoom and changes in the number of mixed pixels and electronic zoom scaling factor as to an imaging apparatus 100 in FIG. 1;

FIGS. 5A, 5B and 5C are diagrams showing a primary-colors filter configuration of an image pickup device 103a shown in FIG. 4, the charge transfer on non-mixture and the process examples of the non-mixture in the image pickup device 103a on an electronic wide, on the optical zoom and on the electronic zoom;

FIG. 10 is a diagram showing the switching process between the optical zoom and electronic zoom by a zoom switching portion 47 of an imaging apparatus 30 in the past;

FIG. 12 is a diagram showing a configuration of a fourth embodiment of the present invention;

DETAILED DESCRIPTION OF THE PREFERRED EMBODIMENTS

Hereafter, embodiments of the present invention will be described by using the drawings.

First Embodiment

Figure 1:
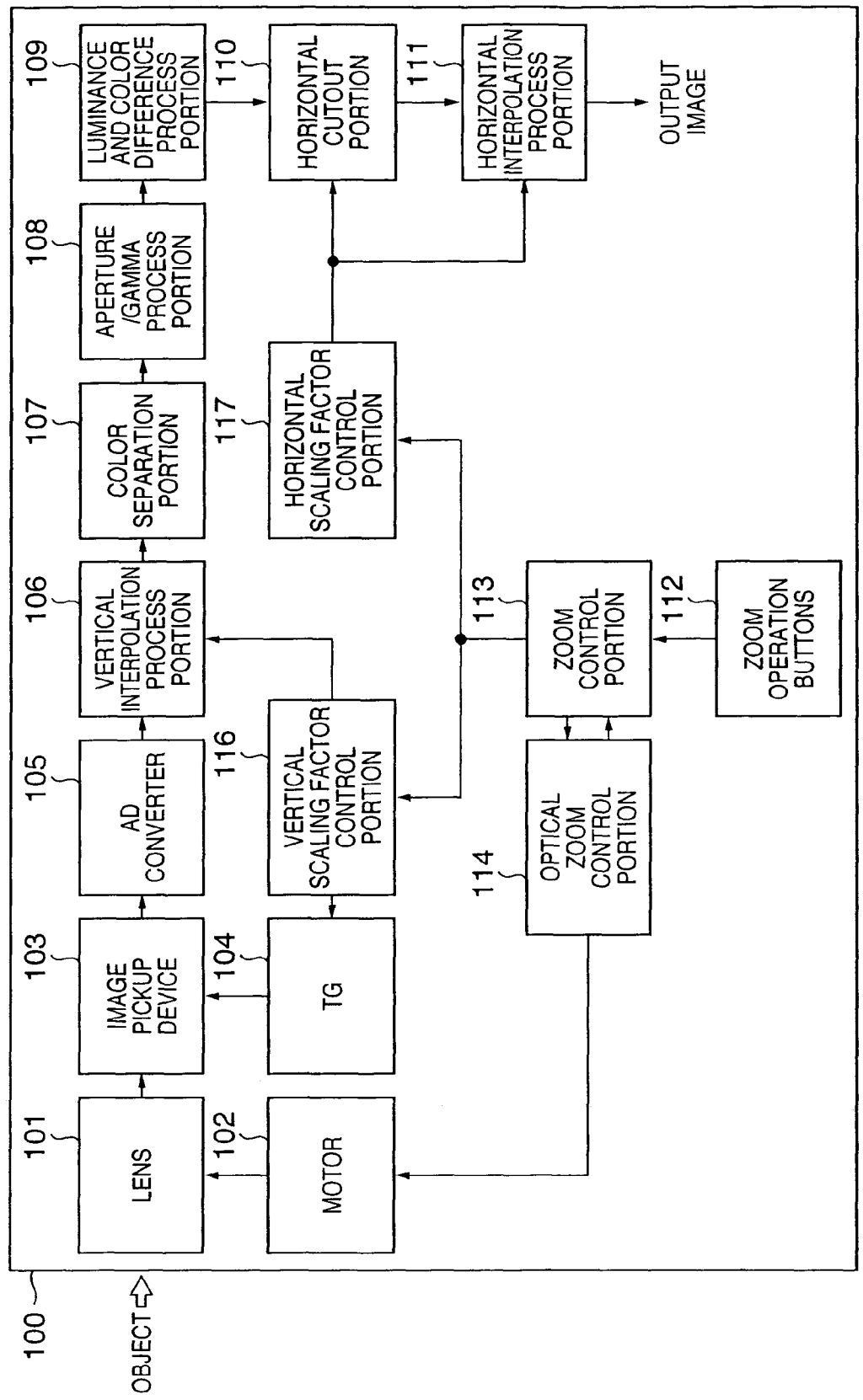
FIG. 1 is a diagram showing an overview configuration of an imaging apparatus according to a first embodiment of the present invention.

First, a description will be given as to an overview configuration of an imaging apparatus according to a first embodiment of the present invention. FIG. 1 is a diagram showing the overview configuration of the imaging apparatus according to the first embodiment of the present invention. In FIG. 1, an imaging apparatus 100 is the imaging apparatus having a zoom function by means of an optical zoom and an electronic zoom for generating a television signal and so on from an output signal of an image pickup device and outputting them. A lens 101 is a zoom lens comprised of a plurality of lenses and so on for forming an object on a light receiving surface of the image pickup device 103 described later. A motor 102 is the motor for driving the lens 101. The motor 102 drives the lens 101 and thereby changes the angle of view of the object to be formed on the image pickup device 103 so as to implement the zoom function.

Figure 3A:
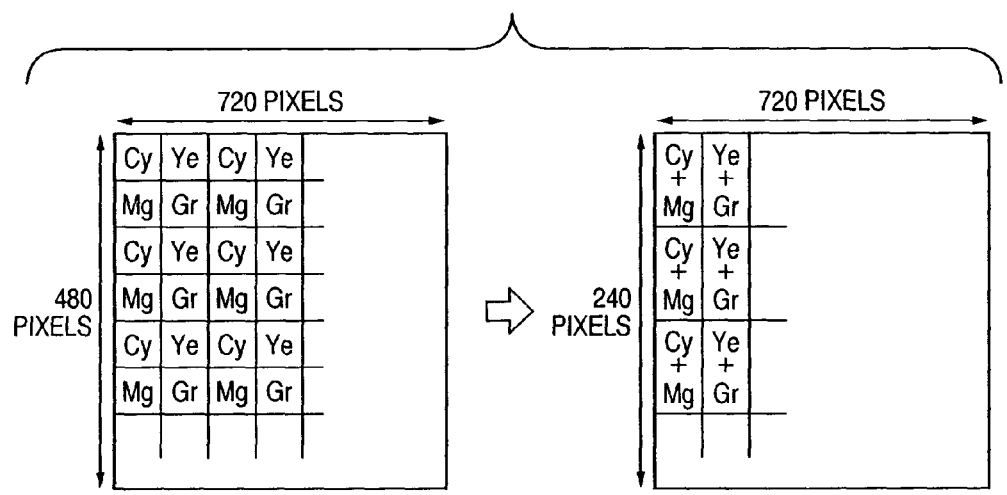
FIGS. 3A and 3B are diagrams showing process examples of charge transfer and pixel mixture in an image pickup device 103 on the optical zoom and on the electronic zoom.

The image pickup device 103 is the image pickup device for photoelectrically converting a CCD and so on. The image pickup device 103 has a plurality of light receiving elements (hereafter, referred to as pixels) having a complementary-colors filter and two-dimensionally placed for performing photoelectric conversion as shown in FIG. 3A, and it reads the charge generated by each pixel and mixes and/or transfers the read charges so as to output the output signal according to the charge amount. The image pickup device 103 also mixes the charges of 1 to N pieces (N is a natural number) of vertically adjacent pixels so as to transfer the charges in units of 1 to N pieces. FIG. 3A and the method of mixing the charges will be described later.

A TG (Timing Signal Generating Means) 104 is a timing generator for driving the image pickup device 103. The TG 104 generates a timing signal for controlling timing for charge storage, charge mixture (pixel mixture) and charge transfer in the image pickup device 103. An AD converter 105 performs an AD (Analog to Digital) conversion for converting the output signal of the image pickup device 103 into a digital signal.

A vertical interpolation process portion 106 is a circuit for vertically interpolating the output signal from the image pickup device 103a on an electronic zoom process. In the case of performing no electronic zoom process, the vertical interpolation process portion 106 outputs an input signal from the AD converter 105 as-is as the output signal.

A color separation portion 107 is the circuit for separating colors of the output signal of the vertical interpolation process portion 106 so as to output an RGB (R (Red), G (Green) and B (Blue)) signal. An aperture/gamma process portion 108 is the circuit for performing to the RGB signal outputted by the color separation portion 107 an aperture process such as an edge enhancement and a gamma process such as a gamma correction. A luminance and color difference process portion 109 is the circuit for generating a luminance signal and a color difference signal from the RGB signal processed by the aperture/gamma process portion 108.

A horizontal cutout portion 110 is the circuit for, on the electronic zoom process, cutting out a central portion of one line in a horizontal direction of the luminance signal and color difference signal outputted by the luminance and color difference process portion 109 according to a processing scaling factor. A horizontal interpolation process portion 111 is the circuit for expanding the luminance signal and color difference signal cut out by the horizontal cutout portion 110 according to the processing scaling factor and horizontally interpolating them. An aspect ratio of a picture signal is adjusted to 4:3 by the processes of the horizontal cutout portion 110 and horizontal interpolation process portion 111.

Zoom operation buttons 112 are buttons for a user to perform a zoom operation, and are comprised of an expansion button (or a TELE button) for expanding an image and a reduction button (or a WIDE button) for returning an expanded image to its original state. When the expansion button is pressed by the user, the zoom operation buttons 112 output an expansion operation signal. When the reduction button is pressed by the user, they output a reduction operation signal.

A zoom control portion 113 is the circuit for determining whether the optical zoom by the lens 101 or the electronic zoom by signal processing should be performed according to the expansion operation signal or reduction operation signal (the two are collectively referred to as the operation signals) outputted by the zoom operation buttons 112 and switching accordingly. Furthermore, in the case of determining to perform the optical zoom, the zoom control portion 113 outputs an indication signal for indicating the scaling factor on the optical zoom to an optical zoom control portion 114 described later. In the case of determining to perform the electronic zoom, the zoom control portion 113 controls a vertical scaling factor control portion 116 and a horizontal scaling factor control portion 117. A processing relationship between the zoom control portion 113 and optical zoom control portion 114 will be described later.

The optical zoom control portion 114 is the circuit for outputting a control signal for controlling the motor 102 to perform the expansion and reduction process by adjusting the angle of view of the object formed for the image pickup device 103 by the lens 101 based on the indication signal of the zoom control portion 113. In the case where the lens 101 is on the most telescopic side (TELE terminal), the optical zoom control portion 114 outputs a notice signal for notifying it to the zoom control portion 113. The zoom control portion 113 switches between the optical zoom and electronic zoom based on the notice signal and the operation signal from the zoom operation buttons 112. The zoom control portion 113 has a scaling factor determination function (scaling factor determination means) for, in the case of performing the electronic zoom process, calculating and determining a next electronic zoom scaling factor based on the electronic zoom scaling factor at the present moment and the operation signal from the zoom operation buttons 112.

The vertical scaling factor control portion 116 has a TG control function (timing signal control means) for controlling the TG 104 to output the timing signal for mixing the charges according to the number of mixes in the vertical direction and transferring the charges in an arbitrary range in the image pickup device based on control of the zoom control portion 113. To be more precise, the vertical scaling factor control portion 116 outputs a TG control signal for controlling the TG 104 to generate the timing signal so that the image pickup device 103 outputs an intermittent output signal in units of one line or outputs the charge of only the central portion of the image pickup device.

The horizontal scaling factor control portion 117 is the circuit for outputting a horizontal scaling factor signal to the horizontal cutout portion 110 and horizontal interpolation process portion 111 for the sake of performing the expansion and reduction process in the horizontal direction.

Here, a switching process and an electronic zoom scaling factor determination process of the zoom control portion 113 will be further described.

FIG. 2 is a diagram showing the switching process between the optical zoom and electronic zoom and changes in the number of mixed pixels and the electronic zoom scaling factor as to the imaging apparatus 100 in FIG. 1.

As shown in FIG. 2, if the expansion button of the zoom operation buttons 112 is continuously pressed in a state in which the lens 101 is at a WIDE terminal (t1), the state of the imaging apparatus 100 changes in the following order. First, the lens 101 moves toward the TELE terminal according to an optical zoom scaling factor, and when the optical zoom scaling factor becomes maximum (10 times for instance), the lens 101 is in the state of having moved to a position of the TELE terminal (t2). Next, the electronic zoom process is started by switching between the optical zoom and electronic zoom so that the electronic zoom scaling factor rises. Thus, when the electronic zoom scaling factor is 2 times for instance, the image of 20 times is provided to an operator of the imaging apparatus 100 by multiplying it by the optical zoom scaling factor of 10 times.

As indicated above, the imaging apparatus 100 performs an optical zoom process or the electronic zoom process according to the operation of the zoom operation buttons 112. In the electronic zoom process, the imaging apparatus 100 determines the electronic zoom scaling factor according to the operation of the zoom operation buttons 112 so as to determine the number of mixed pixels of the charges according to the electronic zoom scaling factor. Thus, in the case where the electronic zoom scaling factor becomes high by the operation of the zoom operation buttons 112, the imaging apparatus 100 can improve the resolution of the image after the electronic zoom by reducing the number of mixed pixels of the charges.

Next, the switching process between the optical zoom and electronic zoom at the time of t2 in FIG. 2 will be described. As shown in FIG. 2, the zoom control portion 113 switches to the electronic zoom after the lens 101 moved by the optical zoom reaches the TELE terminal. To be more precise, the optical zoom control portion 114 detects the TELE terminal of the optical zoom from the position of the motor 102 and outputs the notice signal to the zoom control portion 113. Next, on receipt of the expansion operation signal from the zoom operation buttons 112, the zoom control portion 113 switches to the electronic zoom and calculates a process scaling factor of the electronic zoom so as to output the indication signal of the electronic zoom process including the calculated process scaling factor. In the following description, the operation mode in the case where the imaging apparatus 100 is performing the electronic zoom process without moving an optical lens is an electronic zoom mode, and the operation mode in the case where the optical lens is moved is an optical zoom mode.

Next, the operation of the imaging apparatus 100 will be described by showing process examples of the charge transfer and pixel mixture in the image pickup device 103 on the optical zoom between t1 to t3 in FIG. 2.

FIG. 3A are diagrams showing the process example of the charge transfer and pixel mixture in the image pickup device 103 on the optical zoom As shown in FIG. 3A, the image pickup device 103 is a pixel arrangement having the complementary-colors filter (Cy, Mg, Ye and Gr) for an interlace of vertical 480 pixels and horizontal 720 pixels. As the TG 104 supplies the timing signal, the image pickup device 103 performs the following process in order to read the charges of the entire image pickup device 103 within one field period. First, the image pickup device 103 reads the charges generated by the pixels to a vertical transfer portion, and processes the read charges by mixing the two pixels which are vertically adjacent (Cy+Mg, Ye+Gr). As this mixture process is performed, the number of pixels outputted as the output signals by the image pickup device 103 becomes vertical 240 pixels and horizontal 720 pixels which are half the number of the pixels possessed by the image pickup device 103. To be more specific, the number of pixels to be outputted becomes a half so that the time required for the image pickup device 103 to output all the pixels also becomes approximately a half. Thus, it is possible to read all the pixel-mixed charges within one field period.

Next, the image pickup device 103 transfers the charges having the two pixels mixed in the vertical direction by means of the vertical transfer portion. Next, the image pickup device 103 transfers the charges transferred from the vertical transfer portion for each horizontal line by means of a horizontal transfer portion. And then, the image pickup device 103 converts the charges transferred from the horizontal transfer portion into voltage signals and outputs them as the output signals by means of an output process portion. The image pickup device 103 performs the above process according to the control of the timing signal outputted by the TG 104.

Next, the operation of the imaging apparatus 100 at the time of t3 in FIG. 2 will be described by referring to the operation of the zoom operation buttons 112. Here, a description will be given as to the case where the electronic zoom scaling factor outputted by the zoom control portion 113 is changed from a little under 1.5 times to a little over 1.5 times by the operation of the zoom operation buttons 112. In the case where the electronic zoom scaling factor is a little under 1.5 times, the charges of the two pixels in the vertical direction are mixed, and 60 lines in the upper portion and 60 lines in the lower portion of the image pickup device are swept away so as to output the charges equivalent to 320 lines (equivalent to the mixed 180 lines) of the central portion from the image pickup device. And the charges equivalent to the mixed 180 lines are vertically interpolated by the vertical interpolation process portion 106 to become the charges equivalent to 240 lines.

If the electronic zoom scaling factor becomes a little over 1.5 times, the number of mixed pixels become 1 pixel (non-mixture). In the case of mixing two pixels when it is 1.5 times, to put it simply, the signals equivalent to two to three pixels were created in the vertical direction. As it is changed to the non-mixture, it becomes sufficient to create the signals equivalent to three pixels from the three pixels by subtracting one pixel from four pixels so that the resolution in the vertical direction can be improved.

Next, the vertical scaling factor control portion 116 outputs the TG control signal for controlling the TG 104 to output the timing signal for implementing the charge transfer according to the electronic zoom scaling factor=1.5 times. Thus, the TG 104 outputs to the image pickup device 103 the timing signal for performing a transfer process for outputting the charges from 320 lines in the central portion without the pixel mixture in the units of one line and thinning them out at the rate of one out of four lines. At this time, the image pickup device 103 stops the mixture process of the vertically adjacent pixels, and reads the signals of the pixels as-is in a non-mixture state.

Here, it is also feasible to improve image quality so that a linkage of the images on the lines above and below the thinned-out line looks natural. A description will be given later as to image quality improvement for making the image look natural.

The horizontal scaling factor control portion 117 outputs the horizontal scaling factor signal to the horizontal cutout portion 110 and horizontal interpolation process portion 111. Thus, the horizontal cutout portion 110 performs a cutout process according to the horizontal scaling factor so as to cut out 540 pixels in the central portion of the horizontal 720 pixels. Next, the horizontal interpolation process portion 111 performs a horizontal expansion process for generating expanded pixel data equivalent to one line to the pixel data cut out by the horizontal cutout portion 110. To be more precise, the horizontal interpolation process portion 111 generates the expanded pixel data equivalent to three pixels from the pixel data equivalent to two pixels. Thus, the imaging apparatus 100 can output as an output image the image having an improved vertical resolution compared to two-pixel mixture in the past and the electronic zoom scaling factor of 1.5 times.

Next, the operation of the imaging apparatus 100 will be described by presenting the process examples of the charge transfer and pixel mixture in the image pickup device 103 at the time of t4 in FIG. 2 by referring to the operation of the zoom operation buttons 112.

Figure 3B:
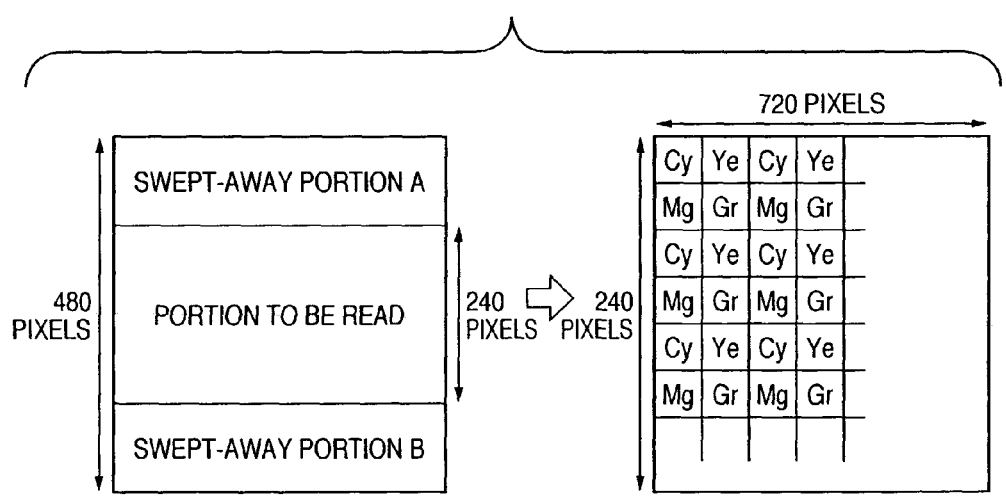

FIG. 3B are diagrams showing the process example of the charge transfer and pixel mixture in the image pickup device 103 on the electronic zoom. The electronic zoom scaling factor outputted by the zoom control portion 113 at this time is 2 times.

As shown in FIG. 3B, as the TG 104 supplies the timing signal, the image pickup device 103 performs the following process in order to read a part of the charges of the image pickup device 103 within the one field period. First, the vertical scaling factor control portion 116 outputs the TG control signal for causing the TG 104 to output the timing signal of non-mixture for outputting the charges equivalent to 240 lines in the image pickup device 103 based on the control of the zoom control portion 113. Thus, the TG 104 supplies to the image pickup device 103 the timing signal of non-mixture for outputting the charges equivalent to 240 lines.

By means of the above-mentioned timing signal, the image pickup device 103 first reads the charges generated by the pixels to the vertical transfer portion. At this time, the image pickup device 103 does not mix the pixels in the vertical transfer portion. Next, the image pickup device 103 sweeps away 120 pixels (a swept-away portion A in FIG. 3B) to be transferred to the horizontal transfer portion first, of the 480 pixels in the vertical direction, by high-speed transfer. Next, the image pickup device 103 transfers 240 pixels in the central portion to the horizontal transfer portion in the units of one line so as to output them from the output process portion. A pixel area in the central portion is an effective area. Next, the image pickup device 103 sweeps away the remaining 120 pixels (a swept-away portion B in FIG. 3B) by the high-speed transfer.

The reason for sweeping away the 120 pixels above and below in the vertical direction is that it is not possible to read all the pixel signals in the effective area of the image pickup device 103 as-is in the non-mixture state within the one field period, and so it is rendered possible, by sweeping away unnecessary portions by the high-speed transfer, to read the pixel signals of non-mixture constituting the effective area.

In the above process, the output signal outputted by the image pickup device 103 is converted into the digital signal by the AD converter 105 and inputted to the vertical interpolation process portion 106. The vertical interpolation process portion 106 outputs it as-is to the next color separation portion 107. Next, the color separation portion 107 generates the RGB signal by performing the process according to the signal having outputted the charges in the non-mixture state. Next, the aperture/gamma process portion 108 performs the aperture process and gamma process to the RGB signal generated by the color separation portion 107. At this time, the color separation portion 107 performs the color separation process by means of the control signal for processing the non-mixture pixels from the vertical scaling factor control portion 116.

Next, the luminance and color difference process portion 109 generates the luminance signal and color difference signal based on the RGB signal outputted by the aperture/gamma process portion 108. Next, the horizontal cutout portion 110 cuts out the 360 pixels in the central portion of the horizontal 720 pixels. The horizontal interpolation process portion 111 expands the cut-out signals in the central portion to a horizontal image period (equivalent to one line) and interpolates them. Thus, the imaging apparatus 100 can adjust the aspect ratio of the image to 4:3 and then output it to the outside.

As indicated above, at the time of t4 in FIG. 2, the zoom operation buttons 112 are operated to control the charge transfer and non-mixture of the image pickup device 103, and an expanded picture signal generates the picture signal of vertical 240 pixels and horizontal 720 pixels from 240 pixels not mixed in the vertical direction and cut-out horizontal 360 pixels. Thus, it is possible to obtain the expanded picture signal of high image quality with little degradation of a vertical resolution compared to the past cases of generating the picture signal of vertical 240 pixels and horizontal 720 pixels from mixed vertical 120 pixels and cut-out horizontal 360 pixels. While the imaging apparatus 100 according to the above-mentioned embodiment has the number of mixed pixels changed on reaching the electronic zoom scaling factor of 1.5 times, it is not limited thereto but it is suitable to define the electronic zoom scaling factor capable of obtaining a higher quality image in consideration of utilization of signal processing for improving the image quality on expansion and reduction which is normally used.

Next, the operation of the imaging apparatus 100 from t4 to t5 in FIG. 2 will be described by referring to the operation of the zoom operation buttons 112. First, the zoom control portion 113 of the imaging apparatus 100 further increases the electronic zoom scaling factor (2 times or more) according to the expansion operation signal from the zoom operation buttons 112. The vertical scaling factor control portion 116 controls the TG 104 to have the charges of the number of lines smaller than 240 lines in the non-mixture state outputted from the image pickup device 103. To be more specific, the charges of the lines exceeding the 120 lines in the upper portion of the image pickup device 103 and the charges of the lines exceeding the 120 lines in the lower portion thereof are swept away. And the charges of the lines less than the 240 lines outputted from the image pickup device 103 are interpolated to become 240 lines by the vertical interpolation process portion 106.

Second Embodiment

Next, as a second embodiment of the present invention, the imaging apparatus having the image pickup device equipped with a primary-colors filter will be described.

Figure 4:
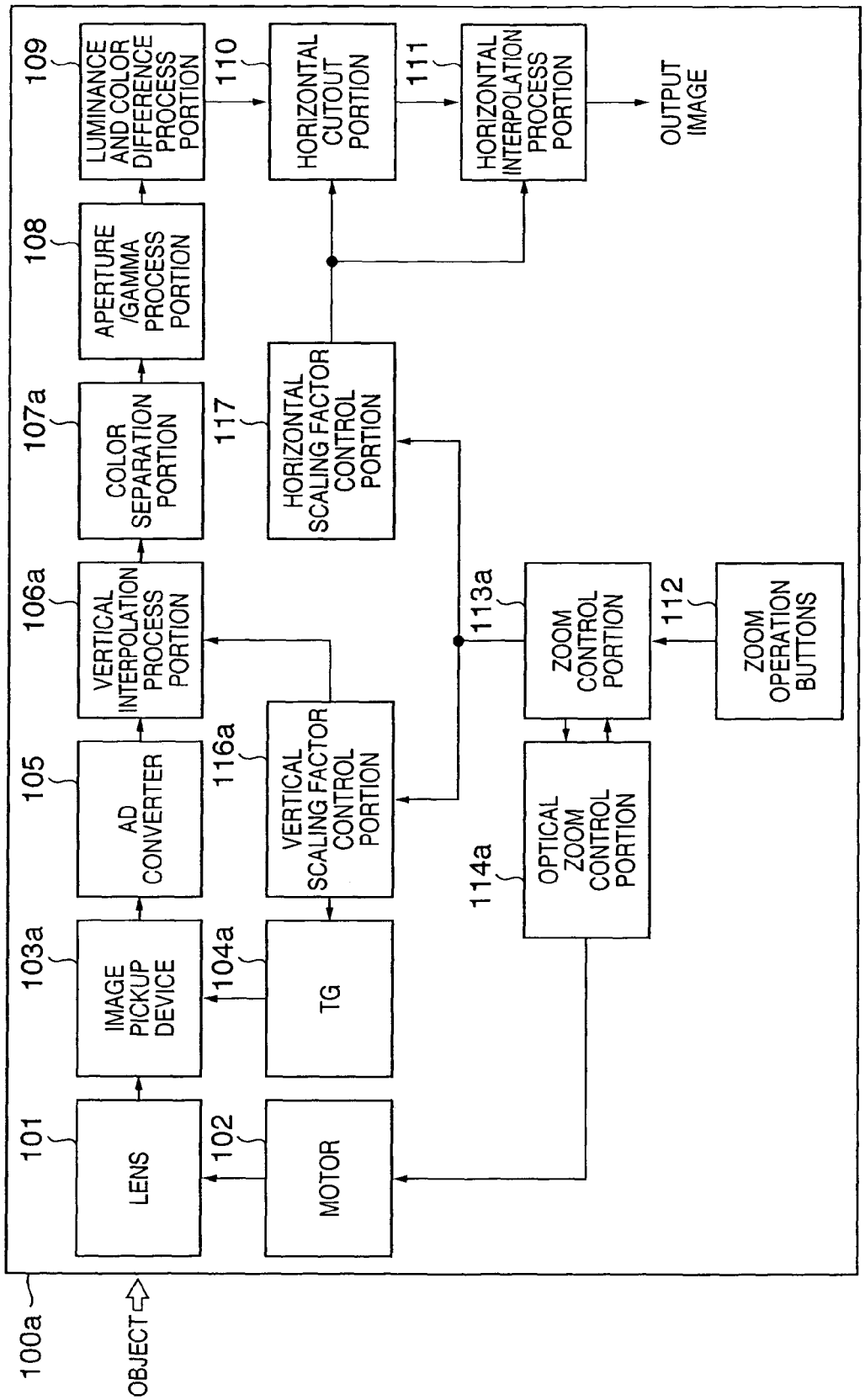
FIG. 4 is a diagram showing the overview configuration of the imaging apparatus having the image pickup device equipped with a primary-colors filter as a second embodiment of the present invention.

FIG. 4 is a diagram showing the overview configuration of the imaging apparatus having the image pickup device equipped with the primary-colors filter as the second embodiment of the present invention. In an imaging apparatus 10a in FIG. 4, those given the same reference numerals as in the imaging apparatus 100 in FIG. 1 (101, 102, 105, 108 to 114, 116 and 117) perform the same processes, and so a description thereof will be omitted.

The functions significantly different between the imaging apparatus 100a in FIG. 4 and the imaging apparatus 100 in FIG. 1 are the following two points.

Having the function of driving the image pickup device equipped with a primary-colors filter and processing the output signal thereof.

Having an electronic wide function by mixing three pixels in the vertical direction.

Hereafter, the imaging apparatus 10a will be described with an emphasis on the above-mentioned two functions. The electronic wide function is the function of electrically performing the reduction process by digital signal processing in a state in which the lens 101 has reached the furthest wide-angle side. Thus, the imaging apparatus 10a can further expand the range of the objects to be outputted as the picture signals.

The image pickup device 103a is the image pickup device equipped with the primary-colors filter of vertical 720 pixels and horizontal 1440 pixels as shown in FIG. 5A. The image pickup device 103a can mix the charges of the three vertically adjacent pixels. FIG. 5A will be described later. A TG 104a is the timing generator for driving the image pickup device 103a. The TG 104a outputs the timing signal for controlling the mixture and transfer in the image pickup device 103a equipped with the primary-colors filter. The vertical interpolation process portion 106a is the circuit for vertically interpolating the output signal from the image pickup device 103a on the electronic zoom process.

In the case of performing no electronic zoom process, the vertical interpolation process portion 106a outputs the input signal from the AD converter 105 as-is as the output signal. A color separation portion 107a is the circuit for separating colors of the output signal of the vertical interpolation process portion 106a so as to output the RGB signal. At this time, the color separation portion 107a performs the signal processing according to the output signal of the image pickup device 103a equipped with the primary-colors filter.

A zoom control portion 113a determines whether the optical zoom by the lens 101 or the electronic zoom or electronic wide by the signal processing should be performed according to the operation signal for giving an instruction for the expansion operation or reduction operation outputted by the zoom operation buttons 112 and switches the operation mode accordingly. Furthermore, in the case of determining to perform the optical zoom, the zoom control portion 113a outputs the indication signal for indicating the scaling factor on the optical zoom to an optical zoom control portion 114a described later.

The processing relationship between the zoom control portion 113a and optical zoom control portion 114a will be described later. In the case of determining to perform the electronic zoom process, the zoom control portion 113a calculates the processing scaling factor of the expansion in the electronic zoom process. In the case of determining to perform the electronic wide process, the zoom control portion 113a calculates the processing scaling factor of the reduction in the electronic wide process. The process wherein the zoom control portion 113a calculates the processing scaling factor of the expansion or reduction will be described later.

The optical zoom control portion 114a is the circuit for outputting the control signal for controlling the motor 102 to perform the expansion and reduction process by adjusting the angle of view of the object formed for the image pickup device 103 by the lens 101 based on the indication signal of the zoom control portion 113a. In the case where the lens 101 is on the most telescopic side (TELE terminal), the optical zoom control portion 114 outputs the notice signal for notifying it to the zoom control portion 113a. In the case where the lens 101 is on the furthest wide-angle side (WIDE terminal), the optical zoom control portion 114 outputs the WIDE terminal notice signal for notifying it to the zoom control portion 113a.

Here, the process in which the zoom control portion 113a calculates and determines the processing scaling factor will be described.

The zoom control portion 113a switches between the optical zoom and electronic zoom based on the TELE terminal notice signal from the optical zoom control portion 114a and the operation signal from the zoom operation buttons 112. The zoom control portion 113a has the scaling factor determination function (scaling factor determination means) for, in the case of performing the electronic zoom process, calculating and determining a next electronic zoom scaling factor based on the electronic zoom scaling factor at the present moment and the expansion operation signal from the zoom operation buttons 112.

The zoom control portion 113a switches between the optical zoom and electronic wide based on the WIDE terminal notice signal from the optical zoom control portion 114a and the operation signal from the zoom operation buttons 112. The zoom control portion 113a has the scaling factor determination function (scaling factor determination means) for, in the case of performing the electronic wide process, calculating and determining a next electronic wide scaling factor based on the electronic wide scaling factor at the present moment and the reduction operation signal from the zoom operation buttons 112. The electronic zoom scaling factor and electronic wide scaling factor are collectively called electronic processing scaling factors.

A vertical scaling factor control portion 116a has the TG control function (timing signal control means) for controlling the TG 104a to output the timing signal for mixing the charges according to the number of mixes in the vertical direction and transferring the charges based on the control of the electronic zoom control portion 113a As described above, the process portions of the imaging apparatus 100a shown in FIG. 4 have approximately the same functions as those of the process portions of the imaging apparatus 100 shown in FIG. 1. The imaging apparatus 100a performs the electronic wide process in the case where the lens 101 reaches the furthest wide-angle side. As for the electronic wide process, however, the imaging apparatus 100 may have the same processing function.

Here, an operation mode switching process and an electronic processing scaling factor determination process of the zoom control portion 113a will be further described.

Figure 6:
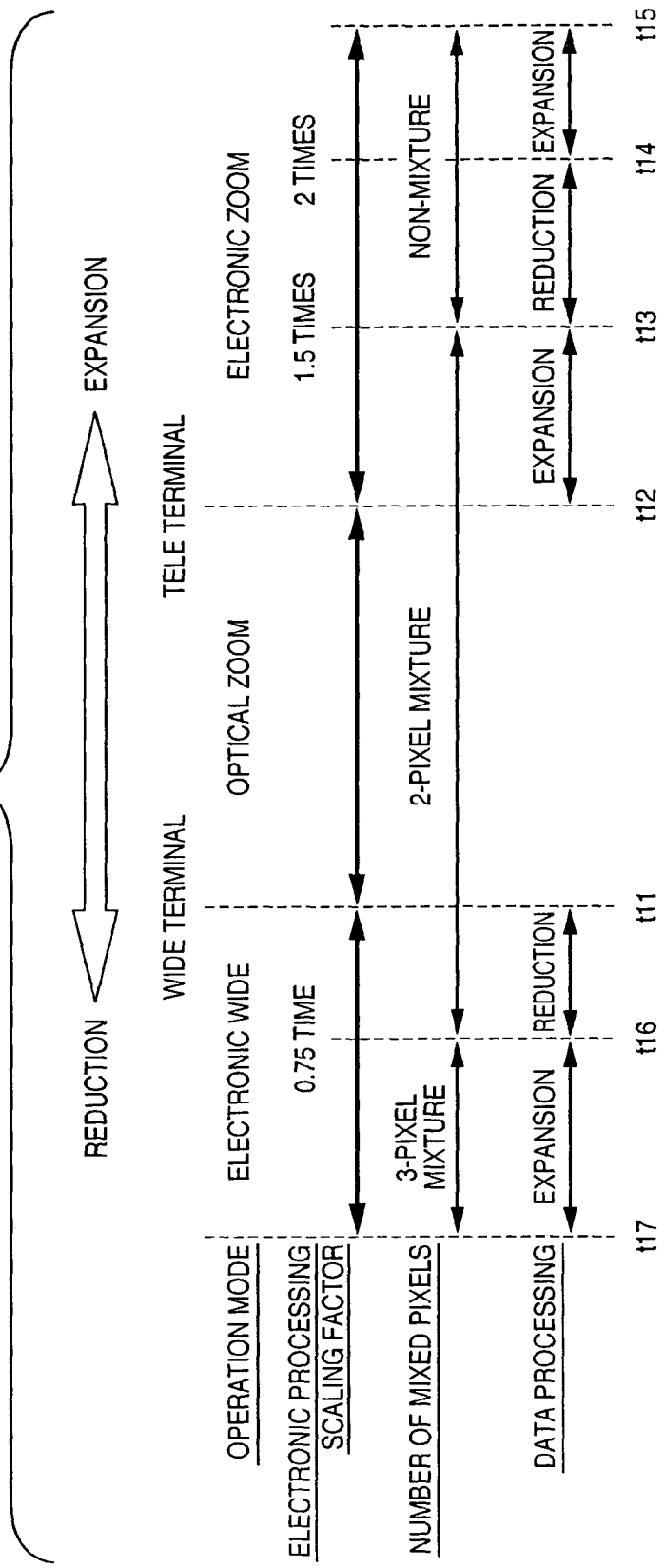
FIG. 6 is a diagram showing a switching process among the electronic wide, optical zoom and electronic zoom as operation modes of an imaging apparatus 100a in FIG. 4.

FIG. 6 is a diagram showing a switching process among the electronic wide, optical zoom and electronic zoom as operation modes of the imaging apparatus 100a in FIG. 4.

First, the operations of the imaging apparatus 100a in the optical zoom process and electronic zoom process will be described.

As shown in FIG. 6, if the expansion button of the zoom operation buttons 112 is continuously pressed in a state in which the lens 101 is at the position of the WIDE terminal (t11), the imaging apparatus 100a performs the optical zoom process and electronic zoom process in order of t11 to t15 in FIG. 6. The process shown by t11 to t15 in FIG. 6 is the same operation as that of the imaging apparatus 100 shown by t1 to t5 in FIG. 2. To be more specific, the optical zoom and electronic zoom operations of the imaging apparatus 10a are the same as those of the above-mentioned imaging apparatus 100. However, the method of mixing the two pixels is different, and so the process examples of the charge transfer and pixel mixture in the image pickup device 103a will be presented, and the operation of the imaging apparatus 100a in t11 to t15 in FIG. 6 will be briefly described.

FIG. 5A is a diagram showing a primary-colors filter configuration of the image pickup device 103a shown in FIG. 4. As shown on the left side of FIG. 5A, the image pickup device 103a has the pixel arrangement of vertical 720 pixels and horizontal 1440 pixels having the primary-colors filter of RGB. In the case of having the process of mixing the two pixels in t11 in FIG. 6 performed to the image pickup device 103a, the imaging apparatus 100a performs the following operation.

FIG. 5B is a diagram showing the process example of the charge transfer and pixel mixture in the image pickup device 103a when mixing two pixels on the optical zoom. As the TG 104a supplies the timing signal, the image pickup device 103a performs the following process in order to read a part of the charges of the image pickup device 103a within the one field period. First, the vertical scaling factor control portion 116a outputs the TG control signal for causing the TG 104a to output the timing signal of two-pixel mixture for outputting the charges equivalent to 240 lines in the image pickup device 103a based on the control of the zoom control portion 113a. Thus, the TG 104a supplies to the image pickup device 103a the timing signal of two-pixel mixture for outputting the charges equivalent to 240 lines.

By means of the above-mentioned timing signal, the image pickup device 103a reads the charges generated by the pixels to the vertical transfer portion, and mixes the two vertically adjacent pixels (R+R, B+B and G+G) as to the read charges. Next, the image pickup device 103a sweeps away 120 pixels (a swept-away portion A in FIG. 5B) to be transferred to the horizontal transfer portion first, of the 720 pixels in the vertical direction, by the high-speed transfer. Next, the image pickup device 103a transfers 240 pixels in the central portion after the two-pixel mixture (480 pixels before the mixture) to the horizontal transfer portion in the units of one line so as to output them from the output process portion. Next, the image pickup device 103a sweeps away the remaining 120 pixels (a swept-away portion B in FIG. 5B) by the high-speed transfer.

The reason for sweeping away the 120 pixels above and below in the vertical direction is to read all the pixel signals of the image pickup device 103a after the two-pixel mixture within the one field period. In the above process, the output signal outputted by the image pickup device 103a is converted into the digital signal by the AD converter 105 and inputted to the vertical interpolation process portion 106a. The vertical interpolation process portion 106a outputs it as-is to the next color separation portion 107a. Next, the color separation portion 107a generates the RGB signal by performing the process according to the output signals (2R, 2B and 2G) of the image pickup device 103a. The process thereafter is omitted since it is the same as that of the imaging apparatus 100 presented by the first embodiment.

Next, in the case of having the process of non-mixture in t14 in FIG. 6 performed to the image pickup device 103a, the imaging apparatus 100a performs the following operation.

FIG. 5C is a diagram showing the charge transfer on non-mixture and the process example of non-mixture in the image pickup device 103a on the electronic zoom. As the TG 104a supplies the timing signal, the image pickup device 103a performs the following process in order to read a part of the charges of the image pickup device 103a within the one field period. First, the vertical scaling factor control portion 116a outputs the TG control signal for causing the TG 104a to output the timing signal of non-mixture for outputting the charges equivalent to 120 lines in the image pickup device 103a based on the control of the zoom control portion 113a. Thus, the TG 104a supplies to the image pickup device 103a the timing signal of non-mixture for outputting the charges equivalent to 240 lines.

By means of the above-mentioned timing signal, the image pickup device 103a reads the charges generated by the pixels to the vertical transfer portion. Next, the image pickup device 103a sweeps away 240 pixels (a swept-away portion C in FIG. 5C) to be transferred to the horizontal transfer portion first, of the 720 pixels in the vertical direction, by high-speed transfer. Next, the image pickup device 103a transfers 240 pixels in the central portion to the horizontal transfer portion in the units of one line so as to output them from the output process portion. Next, the image pickup device 103a sweeps away the remaining 240 pixels (a swept-away portion D in FIG. 5C) by the high-speed transfer.

The reason for sweeping away the 240 pixels above and below in the vertical direction is to read all the pixel signals in the central portion in the vertical direction in the image pickup device 103a within the one field period. In the above process, the output signal outputted by the image pickup device 103a is converted into the digital signal by the AD converter 105 and inputted to the vertical interpolation process portion 106a. The vertical interpolation process portion 106a outputs it as-is to the next color separation portion 107a. Next, the color separation portion 107a generates the RGB signal by performing the process according to the output signals (R, B and G) of the image pickup device 103a. The process thereafter is omitted since it is the same as the imaging apparatus 100 presented by the first embodiment.

Next, the electronic wide operation of the imaging apparatus 100a will be described.

Here, if the reduction button of the zoom operation buttons 112 is continuously pressed in a state in which the lens 101 is at the position between the WIDE terminal and TELE terminal (between t11 and t12), the state of the imaging apparatus 100a changes in the following order. First, the lens 101 moves toward the WIDE terminal according to the optical zoom scaling factor, and when the optical zoom scaling factor becomes minimum (1 time), the lens 101 is in the state of having moved to the position of the WIDE terminal (t11). Next, the electronic wide process is started by switching between the optical zoom and electronic zoom so that the electronic zoom scaling factor falls.

Next, if the electronic processing scaling factors become 0.75 time, the number of mixed pixels is changed from two pixels to three pixels so that it becomes three-pixel mixture (t16). Thus, the imaging apparatus 100a changes from the state of a reduction scaling factor (0.75 time) of thinning out three pixels from twelve pixels (24 pixels of the light receiving elements) in the two-pixel mixture to the state of an expansion scaling factor (1.125 times) of generating nine pixels from eight pixels (24 pixels of the light receiving elements) in the three-pixel mixture. Thus, although the image quality should be further degraded by thinning out a quarter of the pixels in the two-pixel mixture, it is possible, even if the resolution in the three-pixel mixture is lower than that in the two-pixel mixture, to improve overall image quality by utilizing the information on all the pixels in the effective area.

And in the case of falling down to the minimum electronic processing scaling factor (⅔ time) (a state of mixing and reading three vertical pixels from the entire surface of the image pickup device), it stops (t17). According to this embodiment, the minimum electronic processing scaling factor of the imaging apparatus 100a is ⅔ time. However, a further reduction process may be performed to render the electronic processing scaling factor ⅔-time or less. The electronic processing scaling factor for switching from the two-pixel mixture to the three-pixel mixture is not limited to the above-mentioned 0.75 time but may be an optimum scaling factor for improving the image quality in consideration of a combination with an image improvement process to be performed along with the vertical interpolation process.

A description will be given as to the operation of the imaging apparatus 100a when controlled to the furthest wide-angle side (the number of mixes=three pixels) shown by the above-mentioned t17 in FIG. 6.

The drawing shown on the right side of FIG. 5A shows the output signal in the case of mixing and outputting three vertically adjacent pixels. As the TG 104a supplies the timing signal, the image pickup device 103a shown in FIG. 5A performs the following process in order to read the charges of the entire image pickup device 103a within the one field period.

First, the image pickup device 103a reads the charges generated by the pixels to the vertical transfer portion, and processes the read charges by mixing the three pixels which are vertically adjacent (2R+G, B+2G). As this mixture process is performed, the number of the pixels outputted as the output signals by the image pickup device 103a becomes vertical 240 pixels and horizontal 1440 pixels which are a third of the number of the pixels possessed by the image pickup device 103a. To be more specific, the number of the pixels to be outputted becomes a third so that the image pickup device 103a can read all the pixel-mixed charges within the one field period. The above-mentioned all the pixels may be either all the pixels in the effective area of the image pickup device 103a or all the pixels possessed by the image pickup device 103a.

Next, as shown in FIG. 5A, in the image pickup device 103a, the signals having the three pixels mixed are 2R+G, B+2G, ... in the first line, and R+2G, 2B+2, ... in the second line. Thus, the color separation portion 107a separates the R, G and B signals by the following calculation.

$R=(2*(2R+G)-(R+2G))/3$ $G=-((2R+G)-2*(R+2G))/3$ $B=(2*(2B+G)-(B+2G))/3$

Here, the signals acquired by the color separation portion 107a in the above calculation are equivalent to the output signals from the image pickup device which is a Bayer arrangement of vertical 240 pixels and horizontal 1440 pixels. Thus, the color separation portion 107a can generate the RGB signals by performing the color separation process of ordinary primary-colors Bayer arrangement as to each signal acquired by the above calculation. The aperture and gamma processes by the aperture/gamma process portion 108 and the processes by the luminance and color difference process portion 109, horizontal cutout portion 110 and horizontal interpolation process portion 111 are the same processes as those according to the above-mentioned first embodiment, and so a description thereof will be omitted.

According to the above-mentioned embodiment, the three vertically adjacent pixels were mixed as to the charges of the image pickup device 103a. However, it is not limited thereto but may also be a method of mixing the three pixels of the same color adjacent in the vertical direction from the image pickup device 103a.

As shown above, as for the picture signal outputted by the imaging apparatus 100a, the number of the pixels in the vertical direction is constantly 240 pixels on the wide-angle side having mixed the three pixels, in a slightly telescopic area having mixed the two pixels and on the telescopic side for reading them in the non-mixture state. Therefore, it is possible to improve the resolution or image quality in the vertical direction.

According to the above-mentioned embodiment, three pixels were mixed at the maximum. However, it is not limited thereto but it is also possible, as to a setting on the furthest wide-angle side, to mix and read N pixels (N is the maximum number of pixels mixable on the image pickup device) of pixel charges stored in the image pickup device. In this case, it is sufficient to have a configuration wherein the number of pixels to be mixed is reduced from mixing N pixels to mixing N−1 pixels, mixing N−2 pixels, . . . as the setting is gradually changed to the telescopic side by the zoom operation buttons 112. The imaging apparatus of the above-mentioned configuration can switch the number of pixels for mixing the pixels in the vertical direction on the image pickup device according to the operation of the zoom operation buttons 112. Thus, it is possible to obtain an expanded image or a reduced image of which vertical resolution and image quality are hardly degraded.

Third Embodiment

Next, although the imaging apparatus 100 and imaging apparatus 100a are equipped with the lens 101 and motor 102 having the zoom function according to the above-mentioned embodiment, the imaging apparatus equipped with the lens having no zoom function will be described as a third embodiment.

Figure 7:
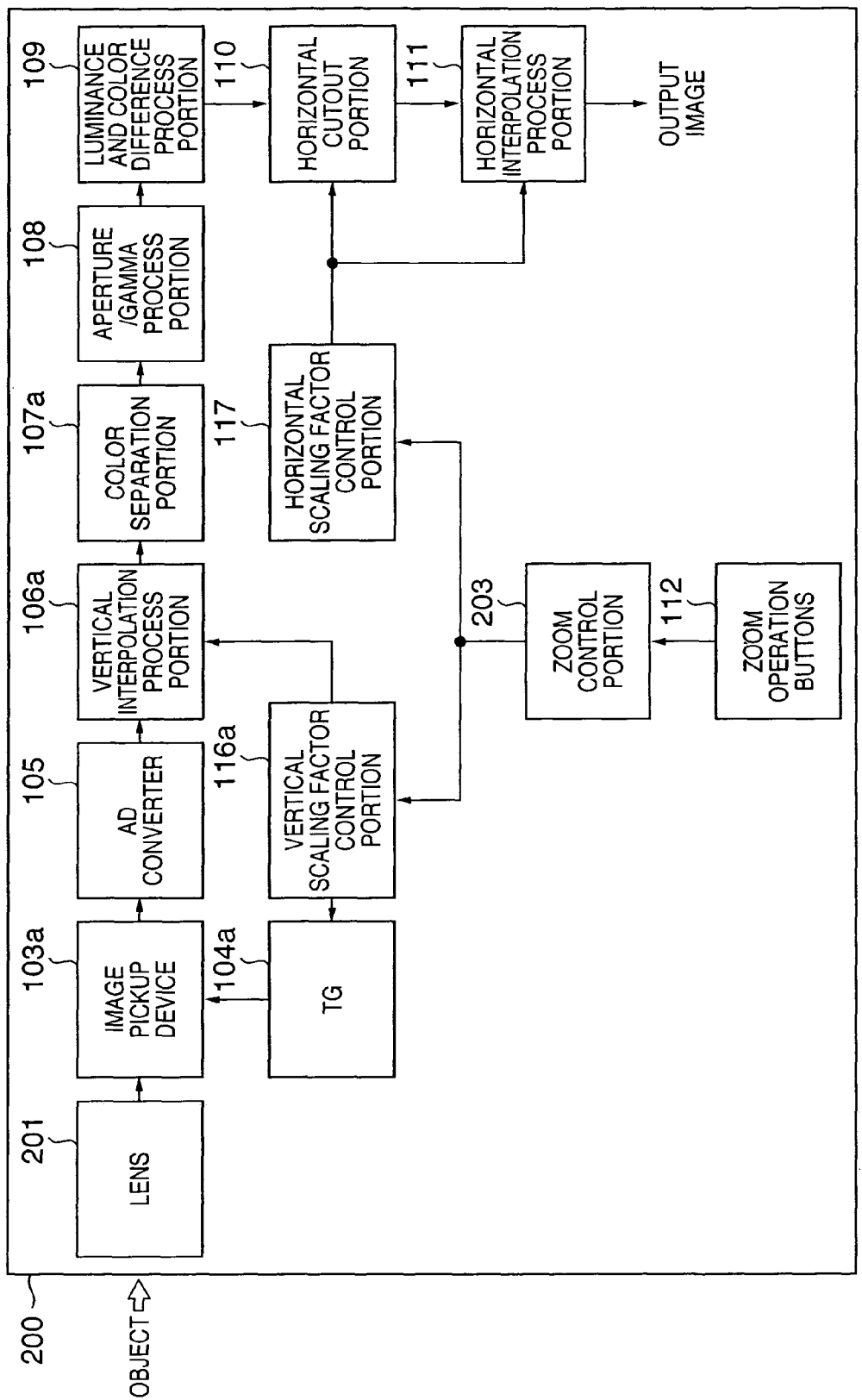
FIG. 7 is a diagram showing the overview configuration of the imaging apparatus having a lens without a zoom function as a third embodiment of the present invention.

FIG. 7 is a diagram showing the overview configuration of the imaging apparatus having the lens with no zoom function as the third embodiment of the present invention. In an imaging apparatus 200 shown in FIG. 7, the portions given the same reference numerals as those in the imaging apparatus 100a in FIG. 4 (103a to 112, 113a to 117) perform the same processes, and so a description thereof will be omitted. The functions significantly different between the imaging apparatus 200 in FIG. 7 and the imaging apparatus 100a in FIG. 4 are the following two points.

The lens has no optical zoom function.

There is no function of switching between the optical zoom and the electronic zoom or electronic wide.

Hereafter, the imaging apparatus 200 will be described with an emphasis on the above-mentioned two functions.

A lens 201 is the lens with no zoom function such as a single-focus lens. A zoom control portion 203 determines whether or not to perform the electronic zoom or electronic wide by the signal processing according to the operation signal for ordering the expansion operation or reduction operation outputted by the zoom operation buttons 112 so as to control an expansion/reduction scaling factor. To be more specific, the zoom control portion 203 calculates the expansion scaling factor in the electronic zoom process in the case of determining to perform the electronic zoom process, and calculates the reduction scaling factor in the electronic wide process in the case of determining to perform the electronic wide process.

Here, a description will be given as to the process in which zoom control portion 203 calculates and determines the scaling factor.

The zoom control portion 203 has the scaling factor determination function (scaling factor determination means) for, in the case of performing the electronic zoom process, calculating and determining the next electronic zoom scaling factor based on the electronic zoom scaling factor at the present moment and the expansion operation signal from the zoom operation buttons 112. The zoom control portion 203 also has the scaling factor determination function (scaling factor determination means) for, in the case of performing the electronic wide process, calculating and determining the next electronic wide scaling factor based on the electronic wide scaling factor at the present moment and the reduction operation signal from the zoom operation buttons 112. The electronic zoom scaling factor and electronic wide scaling factor are collectively called the electronic processing scaling factors.

Next, the electronic processing scaling factor determination process of the zoom control portion 203 will be further described.

Figure 8:
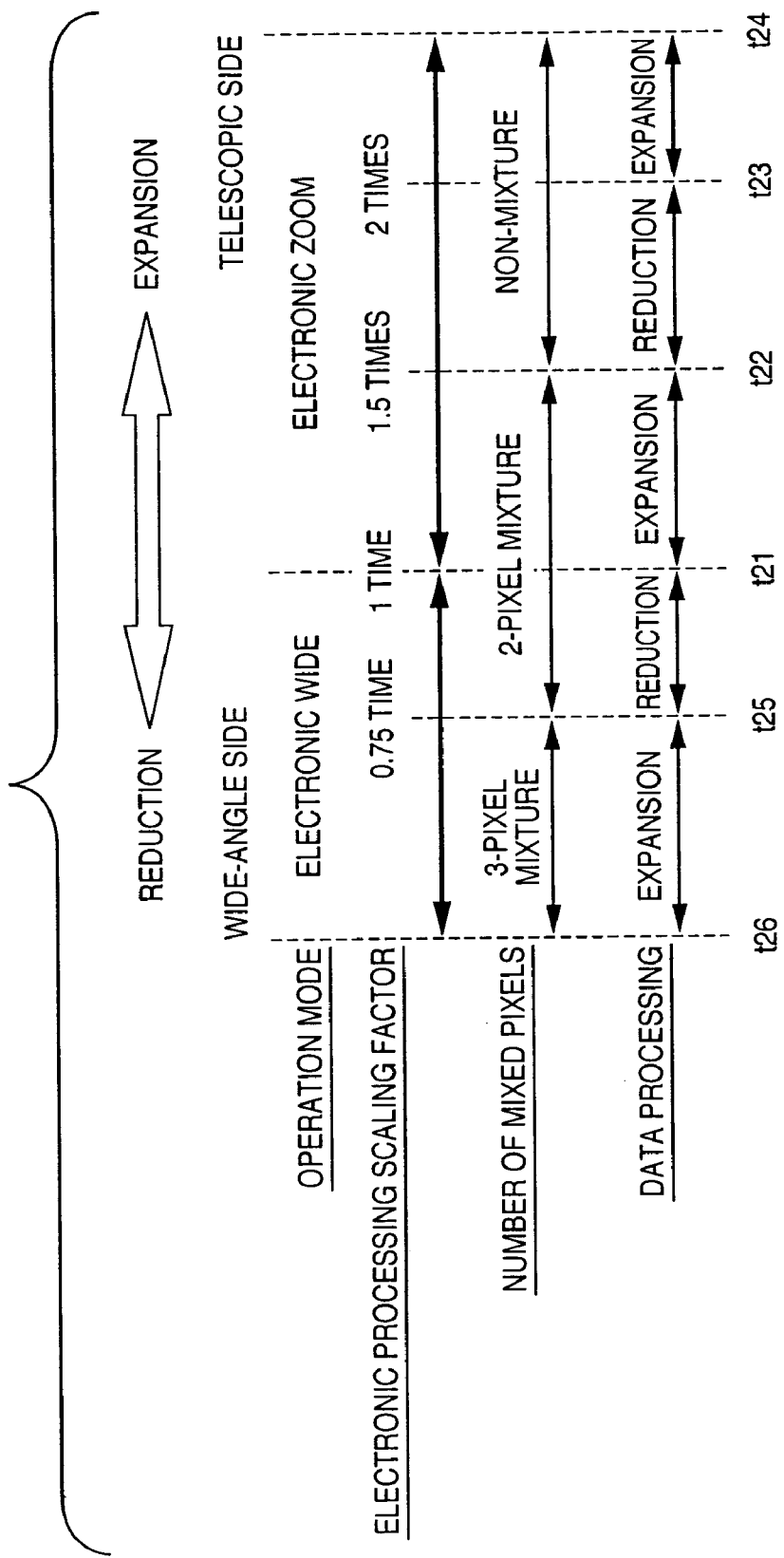
FIG. 8 is a diagram showing changes in the number of mixed pixels and electronic process scaling factor on the electronic wide process or on the electronic zoom process in an imaging apparatus 200 in FIG. 7.
Figure 9:
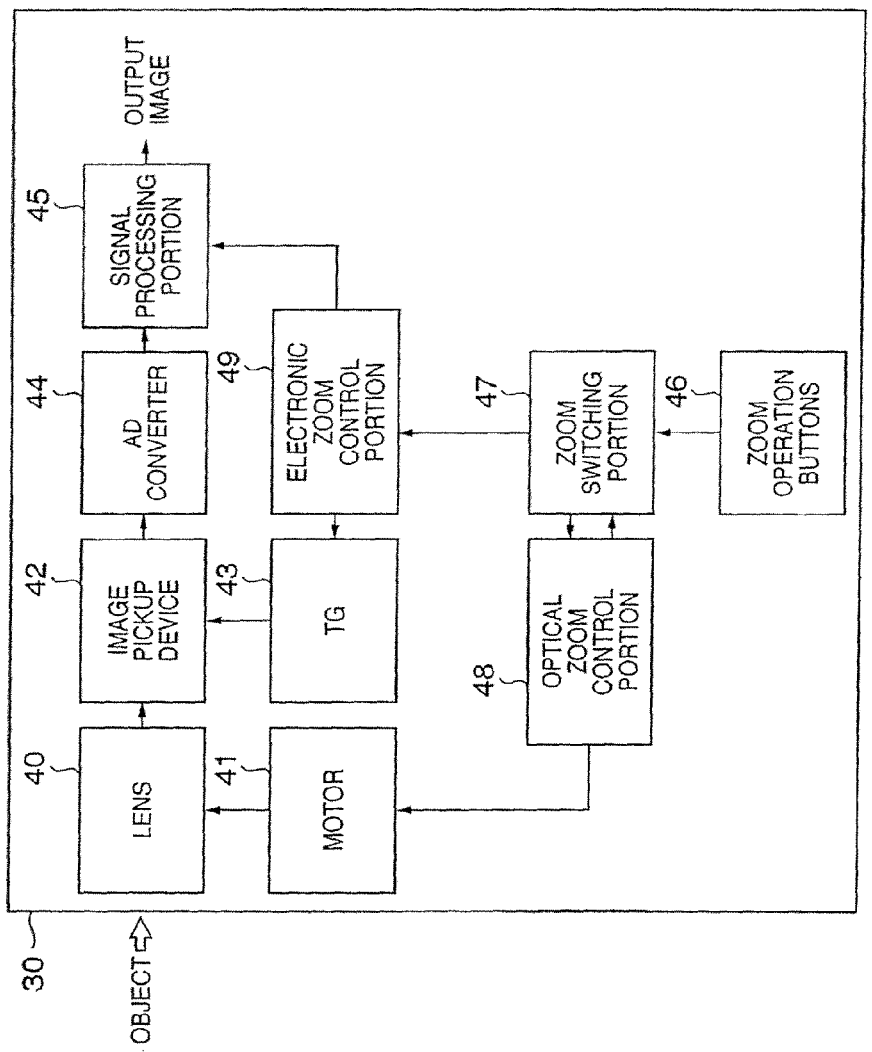
FIG. 9 is a block diagram showing the overview configuration of the imaging apparatus having the zoom function in the past.
Figure 11A:
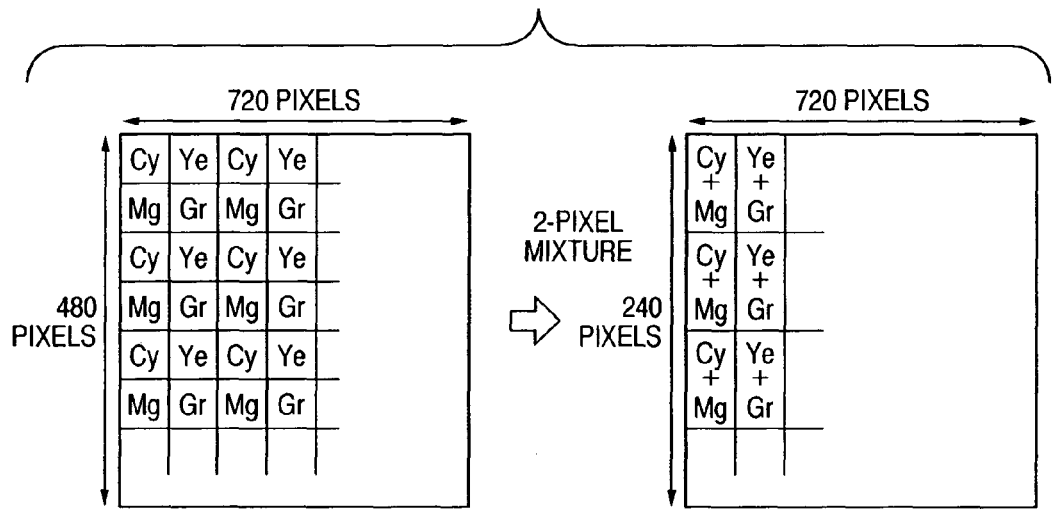
FIGS. 11A and 11B are diagrams showing examples of the pixel mixture of the image pickup device in the past and a method of reading the charges from the image pickup device in the case of performing the electronic zoom process.
Figure 11B:
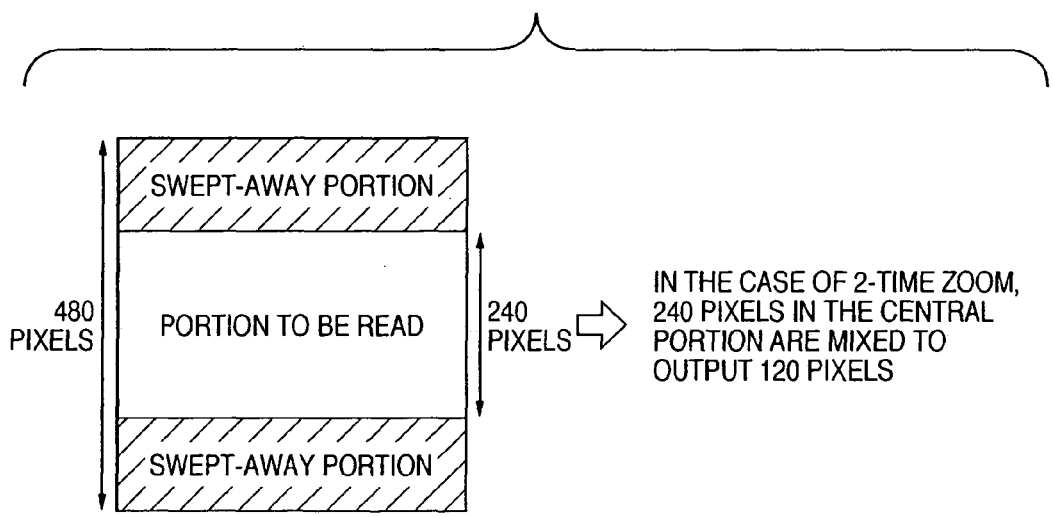

FIG. 8 is a diagram showing changes in the number of mixed pixels and electronic process scaling factor on the electronic wide process or on the electronic zoom process in the imaging apparatus 200 in FIG. 7. As shown in FIG. 8, in the case of the number of mixed pixels=2, the processing scaling factor of the outputted image is 1 time as to the imaging apparatus 200 based on the electronic processing scaling factors=1. The relationship between the scaling factor and electronic processing scaling factor of the image outputted by the imaging apparatus 200 and the number of mixed pixels is not limited to the above description but may also be arbitrarily set.

First, the operation of the electronic zoom process of the imaging apparatus 200 will be described.

As shown in FIG. 8, if the expansion button of the zoom operation buttons 112 is continuously pressed in a state in which the electronic processing scaling factor is 1 time (t21), the imaging apparatus 200 performs the electronic zoom process in order of t21 to t24 in FIG. 8. The process indicated by the t21 to t24 in FIG. 8 is the same operation as that of the imaging apparatus 100a shown by the t12 to t15 in FIG. 6. To be more specific, the electronic zoom operation of the imaging apparatus 200 is the same as that of the above-mentioned imaging apparatus 100a, where t21 and t12, t22 and t13, t23 and t14 and t24 and t15 are corresponding. At this time, the zoom control portion 203 performs the same process as that of the zoom control portion 113a. However, there is no switching process between the optical zoom and electronic zoom in t21 compared to t12, and so the imaging apparatus 200 switches from the electronic zoom process to the electronic wide process.

Next, the electronic wide operation of the imaging apparatus 200 will be described.

The process indicated by the t21 to t25 to t26 in FIG. 8 is the same operation as that of the imaging apparatus 100a shown by the t11 to t16 to t17 in FIG. 6. To be more specific, the electronic wide operation of the imaging apparatus 200 is the same as that of the above-mentioned imaging apparatus 100a, where t21 and t11, t25 and t16 and t26 and t17 are corresponding. At this time, the zoom control portion 203 performs the same process as that of the zoom control portion 113a. However, there is no switching process from the optical zoom to the electronic wide in t21 if compared to t11, and so the imaging apparatus 200 switches from the electronic zoom process to the electronic wide process.

According to the above-mentioned embodiment, the image pickup devices 103 and 103a have a charge mixing function only in the vertical direction. However, it is not limited thereto. For instance, in the case where the image pickup devices 103 and 103a further have a charge mixing function in the horizontal direction, the zoom control portion 203 may calculate and determine the number of mixes and a cutout range separately in the vertical and horizontal directions. In the case where the aspect ratio between the vertical direction and horizontal direction in the image pickup devices 103 and 103a and the aspect ratio of the picture signals outputted by the imaging apparatuses 100 and 100a are the same, the zoom control portion 203 may calculate and determine the number of mixes and the cutout range to be used in common in the vertical and horizontal directions.

As for intermittent lines, the image improvement process for rendering them natural as the image will be described. For instance, the image of an electronic-zoomed oblique straight line becomes a jagged straight line. It becomes a natural image by performing the image improvement process which is generally used such as linear interpolation or spline interpolation. To be more specific, the image improvement process for rendering the image natural means the process such as the linear interpolation or spline interpolation. It is more effective to perform those processes to the luminance signal and color-difference signal rather than the RGB signal.

The above described the first to third embodiments of the present invention in detail by referring to the drawings. However, concrete configurations are not limited to these embodiments but include designs and so on to the extent of not deviating from the gist of the present invention.

As described above, it is possible, according to the first to third embodiments, to adjust the number of the mixed pixels and change the resolution of the image according to the scaling factor of the electronic zoom. To be more specific, it is possible to obtain a sufficient resolution as to the picture signal for zooming in the output signal of the image pickup device by the electronic zoom process.

Fourth Embodiment

FIG. 12 shows a fourth embodiment of the present invention.

First Example

In FIG. 12, reference numeral 1100 denotes a lens for shooting, 1101 denotes a diaphragm apparatus for controlling an amount of light passing through the lens 1400, 1102 denotes a CCD image pickup device for converting a formed optical image into the electrical signal, 1103 denotes a gain control amplifier capable of changing an amplification factor at appropriate times, 1104 denotes an A/D converter for converting an analog signal into the digital signal, 1105 denotes a signal processing circuit for converting an imaging signal into the data for recording, 1106 denotes an electronic zoom circuit for expanding and reducing the signal obtained from the signal processing circuit 1105, 1107 denotes a timing generator for supplying an operation timing signal to each portion, and 1108 denotes a controller for controlling each of the above described.

The optical image having passed through the lens 1100 and diaphragm 1101 is converted into the electrical signal by the CCD image pickup device 1102. The imaging signal obtained from the CCD image pickup device 1102 is preprocessed in an analog fashion by the gain control amplifier 1103, sampled by the A/D converter 1104, processed into a record image signal by the signal processing circuit 1105, recorded on a record medium after being expanded or reduced by the electronic zoom circuit 1106 as appropriate on shooting the moving image thereafter, and sent to the record medium with the as-is number of pixels on recording the static image. Each portion is controlled by the control signal from the controller 1108, and the timing generator 1107 supplies an appropriate timing signal to each portion based on it.

Figure 13:
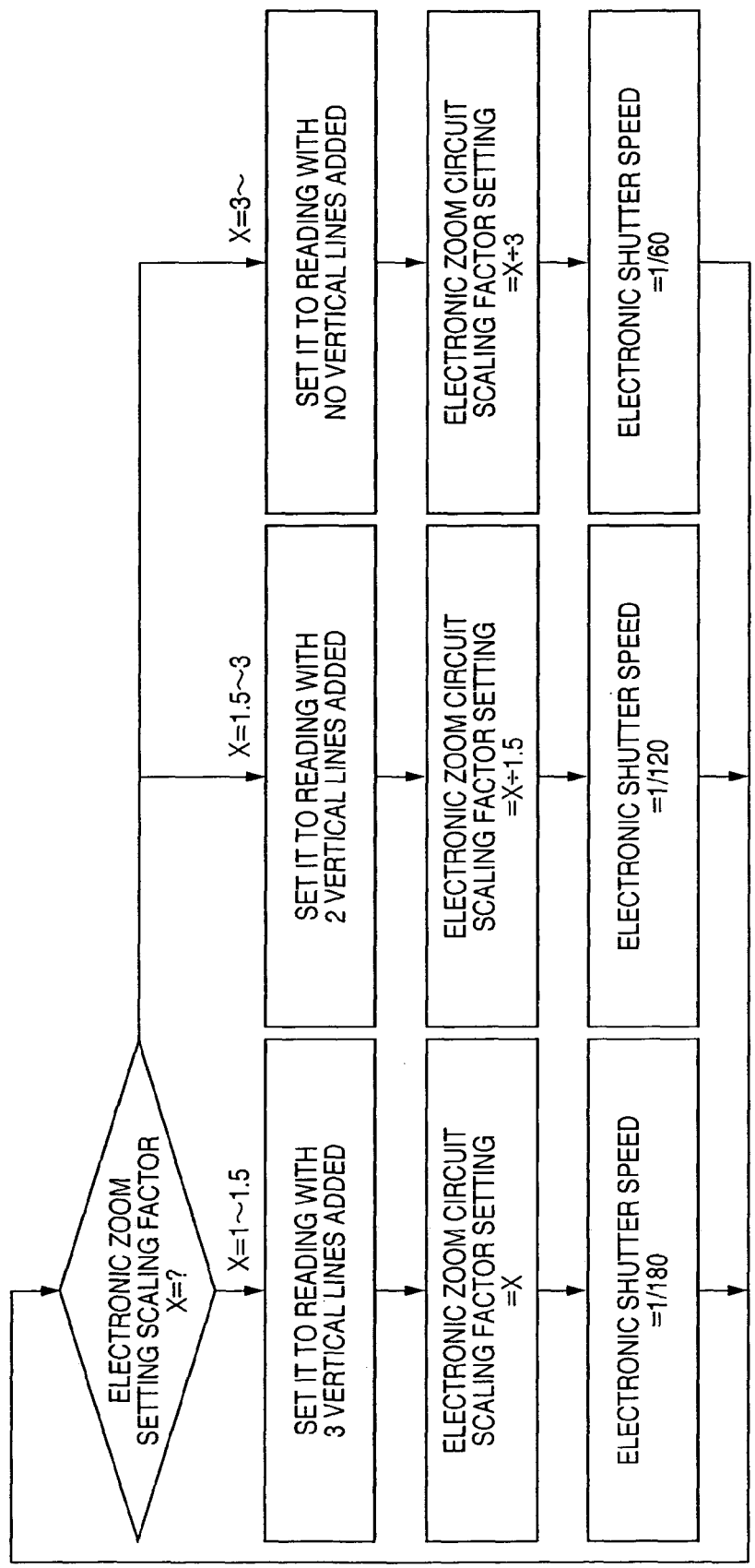
FIG. 13 is a diagram showing operation of a controller according to the first embodiment of the present invention in FIG. 12.

FIG. 13 is a diagram showing the operation of the controller 1108 according to the embodiment of the present invention. The electronic zoom scaling factor is set at 1 time on ordinary shooting, where three vertical lines are added to those on the CCD image pickup device 1102, an electronic shutter speed is $\frac{1}{180}$, and the scaling factor of the electronic zoom circuit 1106 is 1 time.

And in the case of operating the electronic zoom, the signal for adding three lines is used likewise while the electronic zoom scaling factor is set between 1 and 1.5 times, and an electronic zoom scaling factor setting is sequentially assigned to the scaling factor of the electronic zoom circuit 1106 in the following stage to expand it.

Expansion is further continued, and when the electronic zoom scaling factor setting reaches 1.5 times, two vertical lines are added to those of the CCD image pickup device 1102, the electronic shutter speed is $\frac{1}{120}$, and the electronic zoom scaling factor setting divided by 1.5 is assigned to the scaling factor setting of the electronic zoom circuit.

The expansion is further continued, and when the electronic zoom scaling factor setting reaches 3 times, vertical line addition to the CCD image pickup device 1102 is stopped for reading without addition, the electronic shutter speed is $\frac{1}{60}$, and the electronic zoom scaling factor setting divided by 3 is assigned to the scaling factor setting of the electronic zoom circuit.

Second Example

Figure 14:
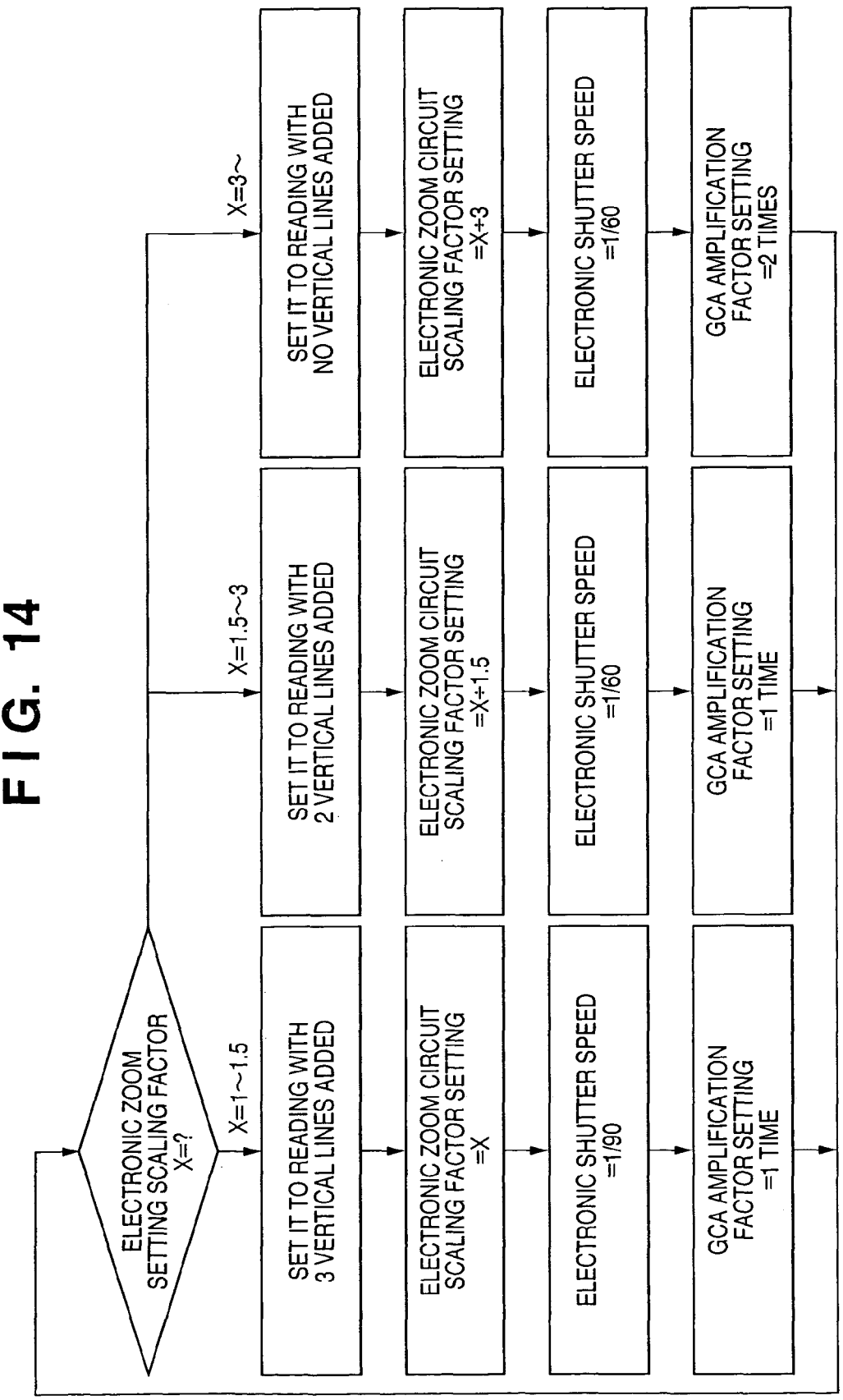
FIG. 14 is a diagram showing the operation of the controller according to the second embodiment of the present invention in FIG. 12.
Figure 15:
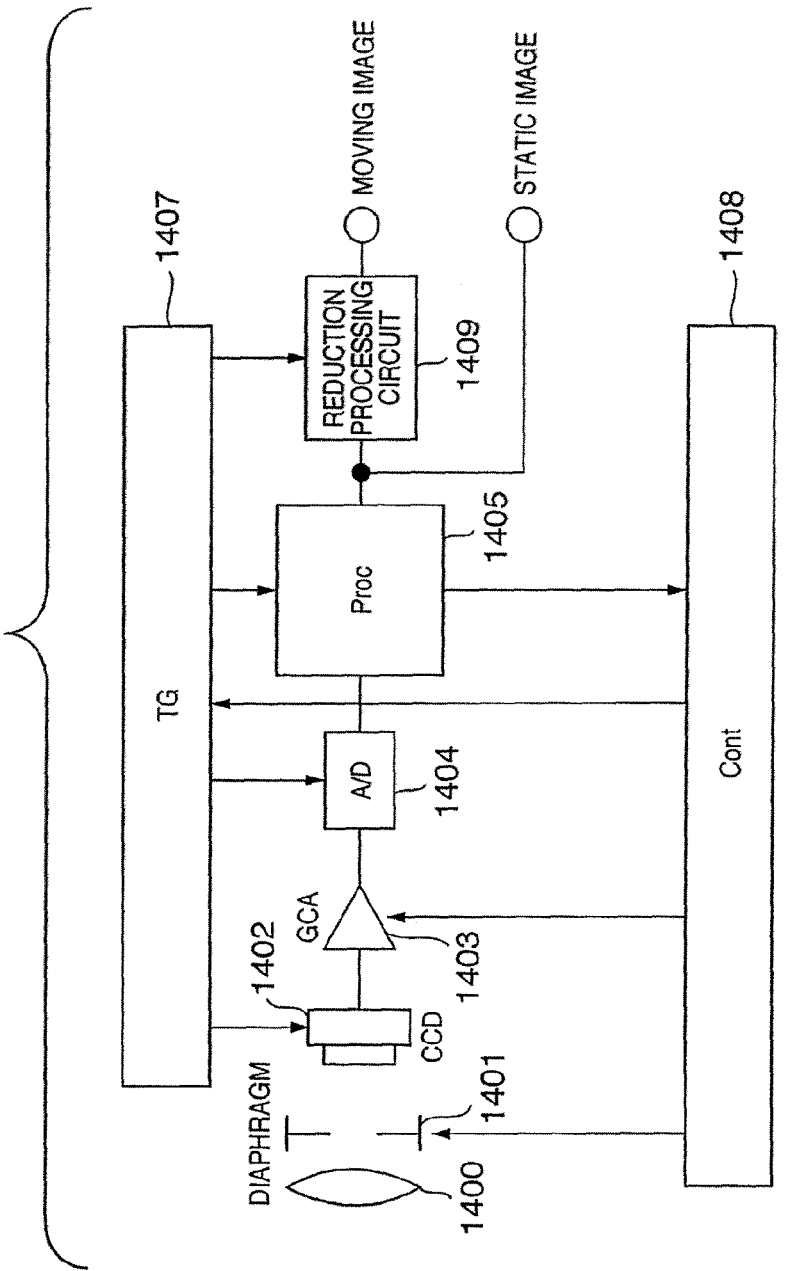
FIG. 15 is a block diagram of an example in the past.
Figure 16:
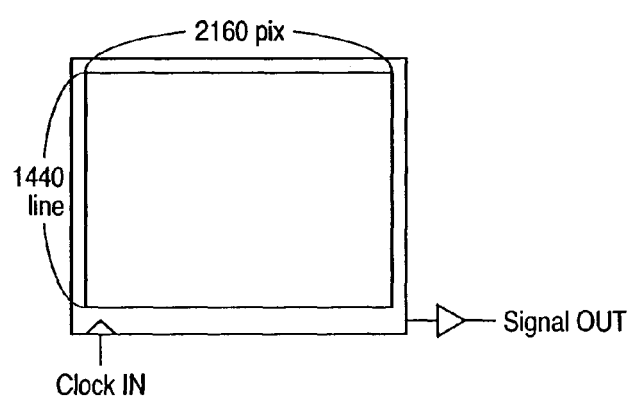
FIG. 16 is a diagram showing an example of the image pickup device used in the embodiments of the present invention and the past invention.
Figure 17A:
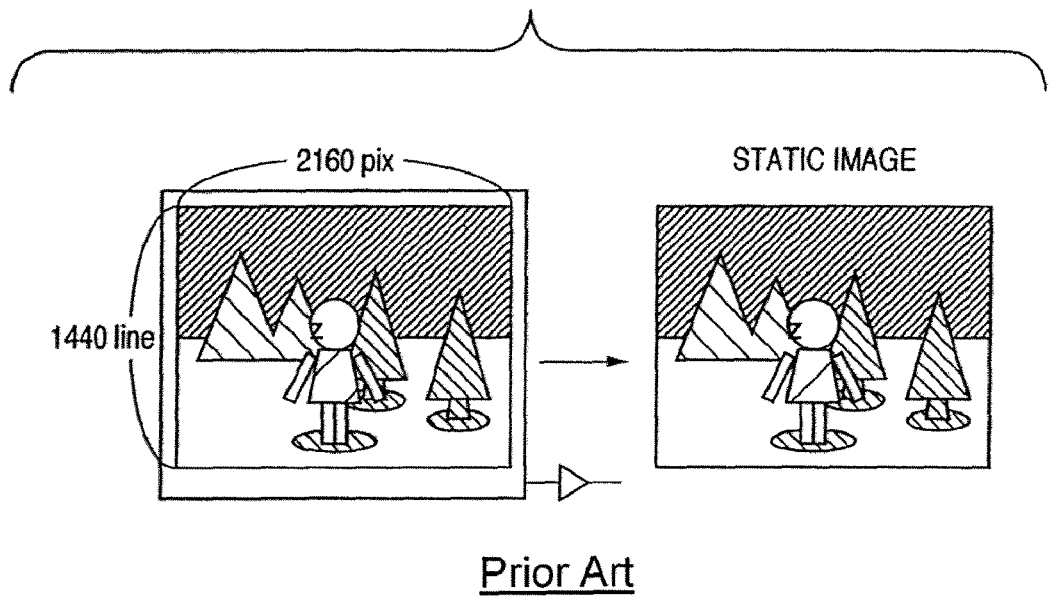
FIGS. 17A and 17B are diagrams showing how imaging is performed in the past example in FIG. 15.
Figure 17B:
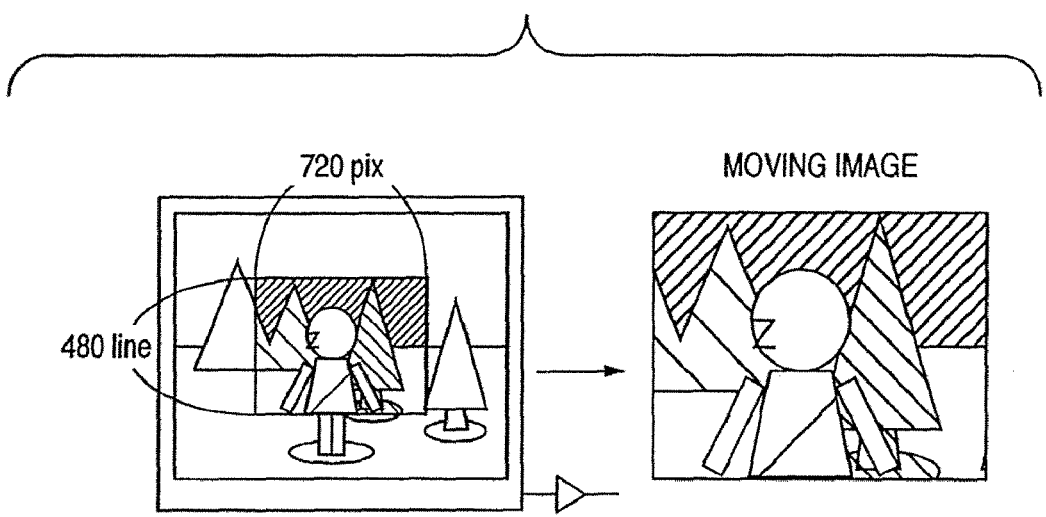
Figure 18:
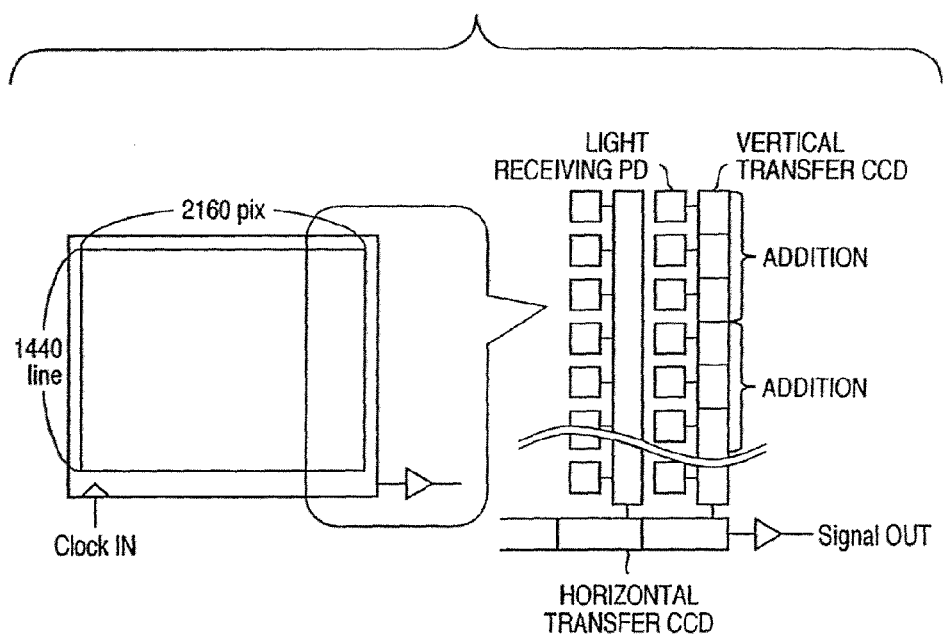
FIG. 18 is a diagram showing an example of pixel addition of the image pickup device in the past example.
Figure 19:
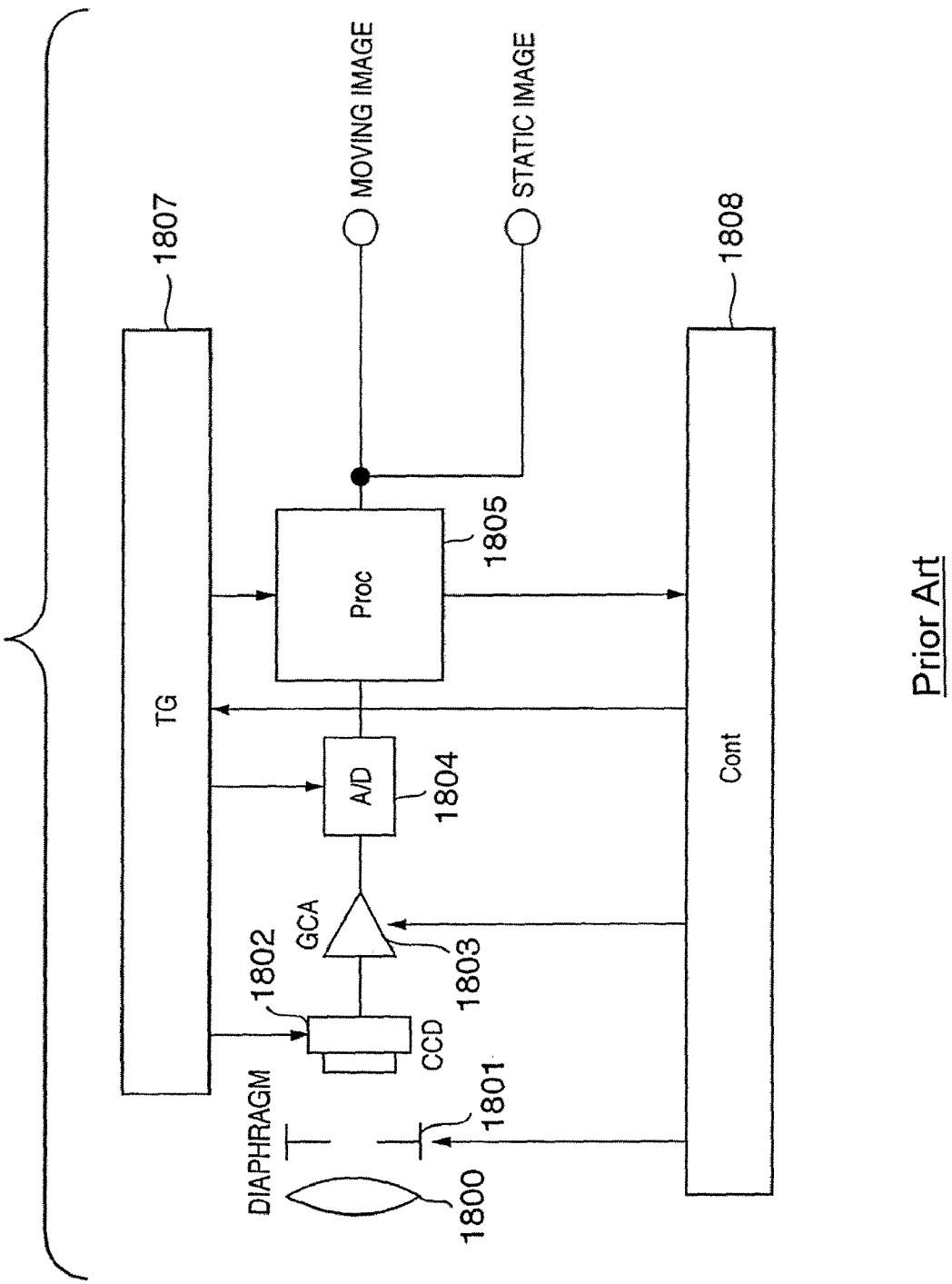
FIG. 19 is a block diagram of an example in the past.
Figure 20:
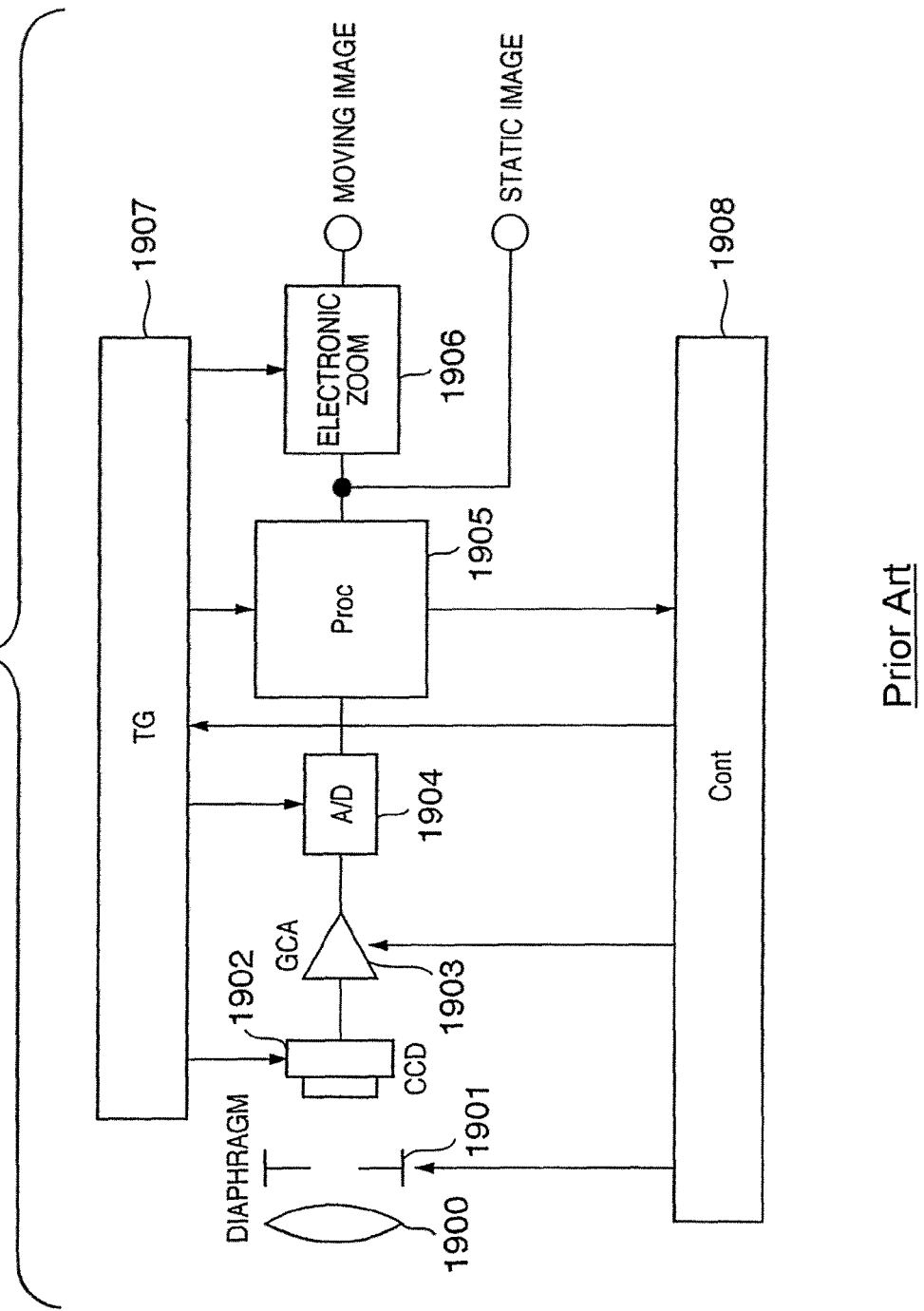
FIG. 20 is a block diagram of an example in the past.
Figure 21:
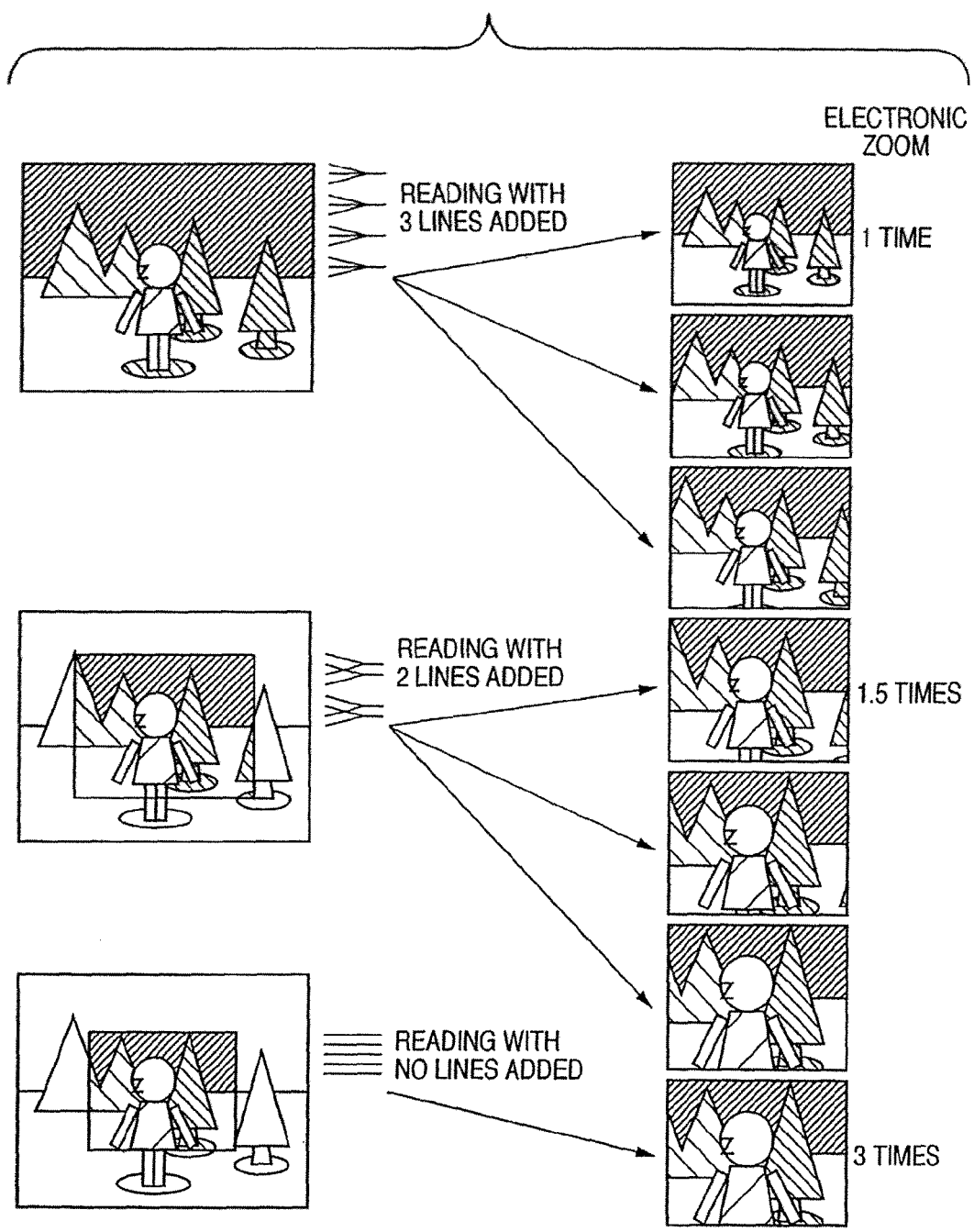
FIG. 21 is a diagram showing the operation of the electronic zoom in the past example.
Figure 22:
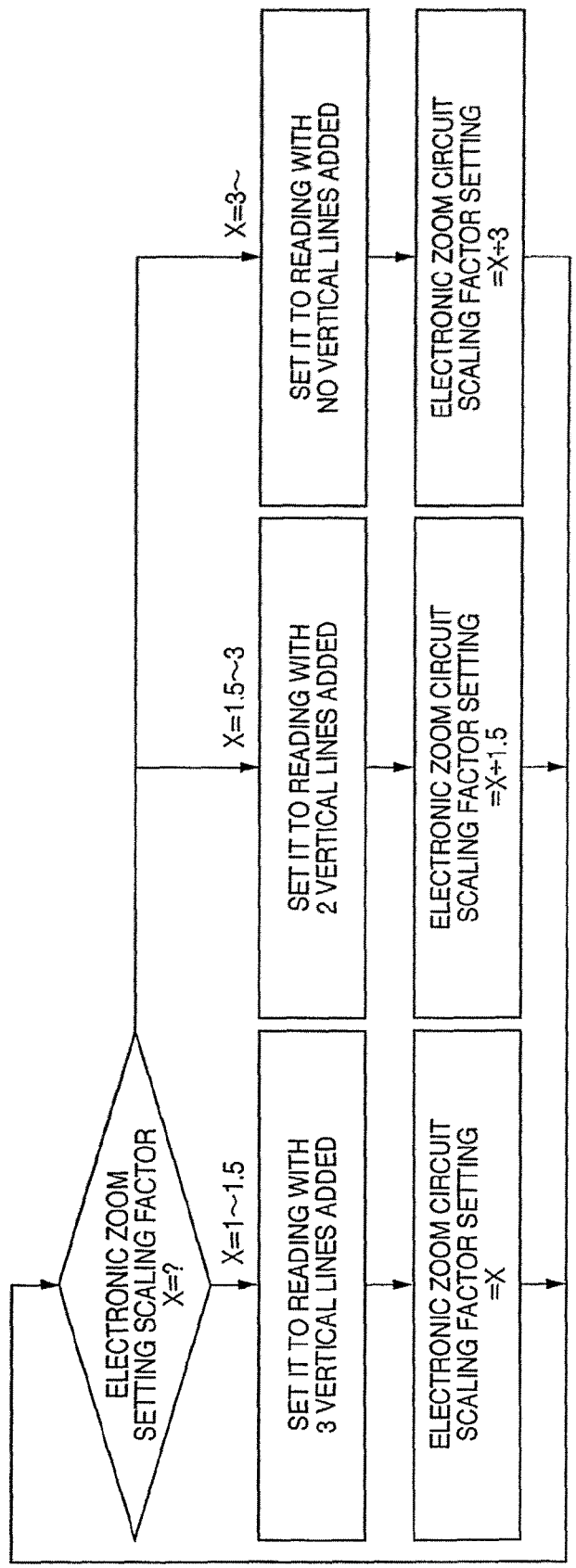
FIG. 22 is a diagram showing the operation of the controller of the past example in FIG. 20.

A second example of the fourth embodiment will be presented. While this example has the same configuration as the aforementioned first example and the past example in FIG. 12, the operation of the controller 1108 for setting the electronic zoom circuit 1106 is as shown in FIG. 14.

The electronic zoom scaling factor is set at 1 time on ordinary shooting, where three vertical lines are added to those of the CCD image pickup device 1102, the electronic shutter speed is $\frac{1}{60}$, the amplification factor of the gain control amplifier 1103 is 1 time, and the scaling factor of the electronic zoom circuit 1106 is 1 time.

And in the case of operating the electronic zoom, the signal for adding three lines is used likewise while the electronic zoom scaling factor is set between 1 and 1.5 times, and the electronic zoom scaling factor setting is sequentially assigned to the scaling factor of the electronic zoom circuit 1106 in the following stage to expand it.

The expansion is further continued, and when the electronic zoom scaling factor setting reaches 1.5 times, two vertical lines are added to those of the CCD image pickup device 1102, the electronic shutter speed is $\frac{1}{60}$, the amplification factor of the gain control amplifier 1103 is 1 time, and the electronic zoom scaling factor setting divided by 1.5 is assigned to the scaling factor setting of the electronic zoom circuit 1106.

The expansion is further continued, and when the electronic zoom scaling factor setting reaches 3 times, vertical line addition to the CCD image pickup device 1102 is stopped for reading without addition, the electronic shutter speed is $\frac{1}{60}$, the amplification factor of the gain control amplifier 1103 is 2 times, and the electronic zoom scaling factor setting divided by 3 is assigned to the scaling factor setting of the electronic zoom circuit 1106.

According to the fourth embodiment, as for the apparatus for recording the moving image by adding vertical line pixels and reading the signals from the pixels on the entire screen, it is possible, when having the configuration for obtaining the electronic zoom of high image quality by switching the numbers to be added for vertical line pixel addition and using the electronic zoom simultaneously, to render the read charge amount on switching the numbers to be added constant so as to eliminate discontinuity in the brightness of the screen which is obtained.

The present invention is not limited to the above embodiments and various changes and modifications can be made within the spirit and scope of the present invention. Therefore, to apprise the public of the scope of the present invention the following claims are made.

What is claimed is:

1. An imaging apparatus comprising:
    an image pickup element having an imaging area in which a plurality of light receiving elements are two-dimensionally placed;
    an amplifier that amplifies an output of said image pickup element;
    a zoom operation unit for a user to operate expansion or reduction of an image; and
    a controller that controls to drive said image pickup element with a first shutter speed of an electronic shutter and mix a first number of pixel signals in the image pickup element, which is output from the plurality of light receiving elements, and set said amplifier to a first amplification ratio, in a case that a first magnification is set by said zoom operation unit, to drive said image pickup element with a second shutter speed of the electronic shutter and mix a second number of pixel signals in the image pickup element, which is output from the plurality of light receiving elements, and set said amplifier to the first amplification ratio, in a case that a second magnification, which is larger than the first magnification, is set by said zoom operation unit, wherein the second shutter speed is lower than the first shutter speed and the second number is smaller than the first number, and to drive said image pickup element with the second shutter speed of the electronic shutter and not mix pixel signals in the image pickup element, which is output from the plurality of light receiving elements, and set said amplifier to a second amplification ratio, which is larger than the first amplification ratio, in a case that a third magnification, which is larger than the second magnification, is set by said zoom operation unit.

2. A method of controlling an imaging apparatus comprising an image pickup element having an imaging area in which a plurality of light receiving elements are two-dimensionally placed, an amplifier that amplifies an output of the image pickup element, and a zoom operation unit for a user to operate expansion or reduction of an image, said method comprising the step of:
    controlling to drive said image pickup element with a first shutter speed of an electronic shutter and mix a first number of pixel signals in the image pickup element, which is output from the plurality of light receiving elements, and set said amplifier to a first amplification ratio, in a case that a first magnification is set by said zoom operation unit, to drive said image pickup element with a second shutter speed of the electronic shutter and mix a second number of pixel signals in the image pickup element, which is output from the plurality of light receiving elements, and set said amplifier to the first amplification ratio, in a case that a second magnification, which is larger than the first magnification, is set by said zoom operation unit, wherein the second shutter speed is lower than the first shutter speed and the second number is smaller than the first number, and to drive said image pickup element with the second shutter speed of the electronic shutter and not mix pixel signals in the image pickup element, which is output from the plurality of light receiving elements, and set said amplifier to a second amplification ratio, which is larger than the first amplification ratio, in a case that a third magnification, which is larger than the second magnification, is set by said zoom operation unit.

* * * * *